United States Patent
Regunathan et al.

(10) Patent No.: US 10,306,227 B2
(45) Date of Patent: *May 28, 2019

(54) ADAPTIVE QUANTIZATION FOR ENHANCEMENT LAYER VIDEO CODING

(71) Applicant: Microsoft Technology Licensing, LLC, Redmond, WA (US)

(72) Inventors: Shankar Regunathan, Bellevue, WA (US); Shijun Sun, Redmond, WA (US); Chengjie Tu, Sammamish, WA (US); Chih-Lung Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/391,609

(22) Filed: Dec. 27, 2016

(65) Prior Publication Data

US 2017/0111640 A1    Apr. 20, 2017

Related U.S. Application Data

(63) Continuation of application No. 14/307,282, filed on Jun. 17, 2014, now Pat. No. 9,571,840, which is a (Continued)

(51) Int. Cl.
*H04N 7/12* (2006.01)
*H04N 11/02* (2006.01)
(Continued)

(52) U.S. Cl.
CPC ......... *H04N 19/126* (2014.11); *H04N 19/124* (2014.11); *H04N 19/172* (2014.11);
(Continued)

(58) Field of Classification Search
CPC .................. H04N 19/126; H04N 19/172; H04N 19/176; H04N 19/186; H04N 19/187;
(Continued)

(56) References Cited

U.S. PATENT DOCUMENTS 1,776,011 A    2/1928    Small
4,334,244 A    6/1982    Chan et al.
(Continued)

FOREIGN PATENT DOCUMENTS

CA    1327074    2/1994
CN    1512785    7/2004
(Continued)

OTHER PUBLICATIONS

First Examination Report dated Sep. 22, 2017, from Indian Patent Application No. 7568/CHENP/2010, 6 pp.
(Continued)

*Primary Examiner* — Jessica M Prince
(74) *Attorney, Agent, or Firm* — Klarquist Sparkman, LLP

(57) ABSTRACT

Techniques and tools for encoding enhancement layer video with quantization that varies spatially and/or between color channels are presented, along with corresponding decoding techniques and tools. For example, an encoding tool determines whether quantization varies spatially over a picture, and the tool also determines whether quantization varies between color channels in the picture. The tool signals quantization parameters for macroblocks in the picture in an encoded bit stream. In some implementations, to signal the quantization parameters, the tool predicts the quantization parameters, and the quantization parameters are signaled with reference to the predicted quantization parameters. A decoding tool receives the encoded bit stream, predicts the quantization parameters, and uses the signaled information to determine the quantization parameters for the macroblocks of the enhancement layer video. The decoding tool performs inverse quantization that can vary spatially and/or between color channels.

20 Claims, 15 Drawing Sheets

Related U.S. Application Data continuation of application No. 12/156,864, filed on Jun. 3, 2008, now Pat. No. 8,897,359.

(51) Int. Cl.

| | |
|---|---|
| *H04N 19/126* | (2014.01) |
| *H04N 19/196* | (2014.01) |
| *H04N 19/176* | (2014.01) |
| *H04N 19/172* | (2014.01) |
| *H04N 19/46* | (2014.01) |
| *H04N 19/61* | (2014.01) |
| *H04N 19/463* | (2014.01) |
| *H04N 19/124* | (2014.01) |
| *H04N 19/186* | (2014.01) |
| *H04N 19/187* | (2014.01) |
| *H04N 19/34* | (2014.01) |
| *H04N 19/593* | (2014.01) |
| *H04N 19/70* | (2014.01) |
| *H04N 19/184* | (2014.01) |

(52) U.S. Cl.
CPC ......... *H04N 19/176* (2014.11); *H04N 19/186* (2014.11); *H04N 19/187* (2014.11); *H04N 19/196* (2014.11); *H04N 19/197* (2014.11); *H04N 19/34* (2014.11); *H04N 19/46* (2014.11); *H04N 19/463* (2014.11); *H04N 19/593* (2014.11); *H04N 19/61* (2014.11); *H04N 19/70* (2014.11); *H04N 19/184* (2014.11)

(58) Field of Classification Search
CPC .... H04N 19/46; H04N 19/124; H04N 19/196; H04N 19/197; H04N 19/34; H04N 19/463; H04N 19/61; H04N 19/184; H04N 19/593

See application file for complete search history.

(56) References Cited

U.S. PATENT DOCUMENTS

| | | |
|---|---|---|
| 4,460,924 A | 7/1984 | Lippel |
| 4,583,114 A | 4/1986 | Catros |
| 4,679,079 A | 7/1987 | Catros et al. |
| 4,760,461 A | 7/1988 | Sato |
| 4,774,574 A | 9/1988 | Daly et al. |
| 4,821,119 A | 4/1989 | Gharavi |
| 4,849,812 A | 7/1989 | Borgers et al. |
| 4,862,264 A | 8/1989 | Wells et al. |
| 4,965,830 A | 10/1990 | Barham et al. |
| 4,992,889 A | 2/1991 | Yamagami et al. |
| 5,072,295 A | 12/1991 | Murakami et al. |
| 5,089,889 A | 2/1992 | Sugiyama |
| 5,128,758 A | 7/1992 | Azadegan et al. |
| 5,136,377 A | 8/1992 | Johnston et al. |
| 5,144,426 A | 9/1992 | Tanaka et al. |
| 5,146,324 A | 9/1992 | Miller et al. |
| 5,179,442 A | 1/1993 | Azadegan et al. |
| 5,210,623 A | 5/1993 | Weldy |
| 5,231,484 A | 7/1993 | Gonzales et al. |
| 5,237,410 A | 8/1993 | Inoue |
| 5,241,395 A | 8/1993 | Chen |
| 5,253,058 A | 10/1993 | Gharavi |
| 5,263,088 A | 11/1993 | Hazu et al. |
| 5,289,283 A | 2/1994 | Hopper et al. |
| 5,301,242 A | 4/1994 | Gonzales et al. |
| 5,303,058 A | 4/1994 | Fukuda et al. |
| 5,317,396 A | 5/1994 | Fujinami |
| 5,317,672 A | 5/1994 | Crossman et al. |
| 5,333,212 A | 7/1994 | Ligtenberg |
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,467,134 A | 11/1995 | Laney et al. |
| 5,473,377 A | 12/1995 | Kim |
| 5,481,553 A | 1/1996 | Suzuki et al. |
| 5,506,916 A | 4/1996 | Nishihara et al. |
| 5,509,089 A | 4/1996 | Ghoshal |
| 5,510,785 A | 4/1996 | Segawa et al. |
| 5,537,440 A | 7/1996 | Eyuboglu et al. |
| 5,537,493 A | 7/1996 | Wilkinson |
| 5,539,469 A | 7/1996 | Jung |
| 5,544,286 A | 8/1996 | Laney |
| 5,559,557 A | 9/1996 | Kato |
| 5,565,920 A | 10/1996 | Lee et al. |
| 5,585,861 A | 12/1996 | Taniguchi et al. |
| 5,587,708 A | 12/1996 | Chiu |
| 5,590,139 A | 12/1996 | Suzuki et al. |
| 5,604,856 A | 2/1997 | Guenter |
| 5,606,371 A | 2/1997 | Gunnewick et al. |
| 5,611,038 A | 3/1997 | Shaw et al. |
| 5,623,424 A | 4/1997 | Azadegan et al. |
| 5,625,714 A | 4/1997 | Fukuda |
| 5,629,779 A | 5/1997 | Jeon |
| 5,631,644 A | 5/1997 | Katata et al. |
| 5,646,691 A | 7/1997 | Yokoyama |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,724,456 A | 3/1998 | Boyack et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,787,203 A | 7/1998 | Lee et al. |
| 5,799,113 A | 8/1998 | Lee |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,149 A | 11/1998 | Astle |
| 5,835,237 A | 11/1998 | Ebrahimi |
| 5,835,495 A | 11/1998 | Ferriere |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A | 3/1999 | Legall |
| 5,880,775 A | 3/1999 | Ross |
| 5,883,672 A | 3/1999 | Suzuki et al. |
| 5,905,504 A | 5/1999 | Barkans et al. |
| 5,923,784 A | 7/1999 | Rao et al. |
| 5,926,209 A | 7/1999 | Glatt |
| 5,926,791 A | 7/1999 | Ogata et al. |
| 5,946,419 A | 8/1999 | Chen et al. |
| 5,959,693 A | 9/1999 | Wu et al. |
| 5,969,764 A | 10/1999 | Sun et al. |
| 5,970,173 A | 10/1999 | Lee et al. |
| 5,990,957 A | 11/1999 | Ryoo |
| 6,026,190 A | 2/2000 | Astle |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Fujiwara |
| 6,088,392 A | 7/2000 | Rosenberg |
| 6,091,777 A | 7/2000 | Guetz et al. |
| 6,104,751 A | 8/2000 | Artieri |
| 6,115,420 A | 9/2000 | Wang |
| 6,115,689 A | 9/2000 | Malvar |
| 6,118,817 A | 9/2000 | Wang |

(56) References Cited

U.S. PATENT DOCUMENTS

| | | |
|---|---|---|
| 6,118,903 A | 9/2000 | Liu |
| 6,125,140 A | 9/2000 | Wilkinson |
| 6,125,147 A | 9/2000 | Florencio et al. |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,219,838 B1 | 4/2001 | Cherichetti et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,281,942 B1 | 8/2001 | Wang |
| 6,285,774 B1 | 9/2001 | Schumann et al. |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 | 4/2002 | Florencio et al. |
| 6,380,985 B1 | 4/2002 | Callahan |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,409 B1 | 10/2002 | Malvar |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,556,925 B1 | 4/2003 | Mori et al. |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,625,215 B1 | 9/2003 | Faryar et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,693,645 B2 | 2/2004 | Bourges-Sevenier |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,748,020 B1 | 6/2004 | Eifrig et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | Van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,368 B1 | 3/2005 | Yu et al. |
| 6,873,654 B1 | 3/2005 | Rackett |
| 6,876,703 B2 | 4/2005 | Ismaeil et al. |
| 6,882,753 B2 | 4/2005 | Chen et al. |
| 6,895,052 B2 | 5/2005 | Hanamura et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,977,659 B2 | 12/2005 | Dumitras et al. |
| 6,980,595 B2 | 12/2005 | Rose et al. |
| 6,983,018 B1 | 1/2006 | Lin et al. |
| 6,990,242 B2 | 1/2006 | Malvar |
| 6,992,725 B2 | 1/2006 | Mohsenian |
| 7,016,546 B2 | 3/2006 | Fukuhara et al. |
| 7,020,204 B2 | 3/2006 | Auvray et al. |
| 7,027,506 B2 | 4/2006 | Lee et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,072,525 B1 | 7/2006 | Covell |
| 7,099,389 B1 | 8/2006 | Yu et al. |
| 7,099,515 B2 | 8/2006 | Lin et al. |
| 7,110,455 B2 | 9/2006 | Wu et al. |
| 7,158,668 B2 | 1/2007 | Munsil et al. |
| 7,162,096 B1 | 1/2007 | Horowitz |
| 7,200,277 B2 | 4/2007 | Joshi et al. |
| 7,233,362 B2 | 6/2007 | Wu |
| 7,263,125 B2 | 8/2007 | Lainema |
| 7,280,700 B2 | 10/2007 | Tourapis et al. |
| 7,289,154 B2 | 10/2007 | Gindele |
| 7,295,609 B2 | 11/2007 | Sato et al. |
| 7,301,999 B2 | 11/2007 | Filippini et al. |
| 7,307,639 B1 | 12/2007 | Dumitras et al. |
| 7,308,151 B2 | 12/2007 | Munsil et al. |
| 7,356,085 B2 | 4/2008 | Gavrilescu et al. |
| 7,463,780 B2 | 12/2008 | Fukuhara et al. |
| 7,471,830 B2 | 12/2008 | Lim et al. |
| 7,570,834 B2 | 8/2009 | Deshpande |
| 7,580,584 B2 | 8/2009 | Holcomb et al. |
| 7,593,582 B2 | 9/2009 | Govindaswamy et al. |
| 7,602,851 B2 | 10/2009 | Lee et al. |
| 7,609,767 B2 | 10/2009 | Srinivasan et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 | 8/2011 | Zuo et al. |
| 8,059,721 B2 | 11/2011 | Chang et al. |
| 8,130,828 B2 | 3/2012 | Hsu et al. |
| 8,160,374 B2 | 4/2012 | Zheng et al. |
| 8,184,694 B2 | 5/2012 | Srinivasan |
| 8,189,933 B2 | 5/2012 | Holcomb et al. |
| 8,238,424 B2 | 8/2012 | Chang et al. |
| 8,243,797 B2 | 8/2012 | Lin et al. |
| 8,249,145 B2 | 8/2012 | Chang et al. |
| 8,331,438 B2 | 12/2012 | Chang et al. |
| 8,351,502 B2 | 1/2013 | Lee et al. |
| 8,411,753 B2 | 4/2013 | Cha et al. |
| 8,422,546 B2 | 4/2013 | Lin et al. |
| 8,428,136 B2 | 4/2013 | Chono |
| 8,442,337 B2 | 5/2013 | Zuo et al. |
| 8,498,335 B2 | 7/2013 | Holcomb et al. |
| 8,503,536 B2 | 8/2013 | Zuo et al. |
| 8,576,908 B2 | 11/2013 | Lin et al. |
| 8,588,298 B2 | 11/2013 | Srinivasan |
| 8,711,925 B2 | 4/2014 | Tu et al. |
| 8,897,359 B2 | 11/2014 | Regunathan et al. |
| 9,185,418 B2 | 11/2015 | Regunathan et al. |
| 9,571,840 B2 | 2/2017 | Regunathan et al. |

(56) References Cited

U.S. PATENT DOCUMENTS

| | | |
|---|---|---|
| 9,686,557 B2 | 6/2017 | Lin et al. |
| 9,967,561 B2 | 5/2018 | Tu et al. |
| 2001/0017887 A1 | 8/2001 | Furukawa et al. |
| 2001/0048718 A1 | 12/2001 | Bruls et al. |
| 2002/0021756 A1 | 2/2002 | Jayant et al. |
| 2002/0024999 A1 | 2/2002 | Yamaguchi et al. |
| 2002/0044602 A1 | 4/2002 | Ohki |
| 2002/0118748 A1 | 8/2002 | Inomata et al. |
| 2002/0136297 A1 | 9/2002 | Shimada et al. |
| 2002/0136308 A1 | 9/2002 | Le Maguet et al. |
| 2002/0118884 A1 | 10/2002 | Cho et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0058944 A1 | 3/2003 | MacInnis et al. |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1 | 7/2003 | Srinivasan |
| 2003/0147463 A1 | 8/2003 | Sato et al. |
| 2003/0185420 A1 | 10/2003 | Sefcik et al. |
| 2003/0189980 A1 | 10/2003 | Dvir et al. |
| 2003/0194010 A1 | 10/2003 | Srinivasan et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2003/0235247 A1 | 12/2003 | Wu et al. |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0170395 A1 | 9/2004 | Filippini et al. |
| 2004/0174464 A1 | 9/2004 | MacInnis et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0021579 A1 | 1/2005 | Bae et al. |
| 2005/0024487 A1 | 2/2005 | Chen |
| 2005/0031034 A1 | 2/2005 | Kamaci et al. |
| 2005/0036698 A1 | 2/2005 | Beom |
| 2005/0036699 A1* | 2/2005 | Holcomb ............ H04N 19/176 382/239 |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0105889 A1 | 5/2005 | Conklin |
| 2005/0123048 A1 | 6/2005 | Kondo et al. |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152448 A1 | 7/2005 | Crinon et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0243918 A1 | 11/2005 | Ebara et al. |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083300 A1 | 4/2006 | Han et al. |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote |
| 2006/0126728 A1 | 6/2006 | Yu et al. |
| 2006/0133478 A1 | 6/2006 | Wen |
| 2006/0133479 A1 | 6/2006 | Chen et al. |
| 2006/0133689 A1 | 6/2006 | Andersson et al. |
| 2006/0140267 A1 | 6/2006 | He et al. |
| 2006/0165176 A1 | 7/2006 | Raveendran et al. |
| 2006/0188014 A1 | 8/2006 | Civanlar et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1 | 11/2006 | Lin et al. |
| 2006/0256851 A1 | 11/2006 | Wang et al. |
| 2006/0256867 A1 | 11/2006 | Turaga et al. |
| 2006/0257037 A1 | 11/2006 | Samadani |
| 2006/0268990 A1 | 11/2006 | Lin et al. |
| 2006/0268991 A1 | 11/2006 | Segall et al. |
| 2006/0274959 A1 | 12/2006 | Piastowski |
| 2007/0002946 A1 | 1/2007 | Bouton et al. |
| 2007/0009039 A1 | 1/2007 | Ryu |
| 2007/0009042 A1 | 1/2007 | Craig et al. |
| 2007/0053603 A1 | 3/2007 | Monro |
| 2007/0081586 A1 | 4/2007 | Raveendran et al. |
| 2007/0081588 A1 | 4/2007 | Raveendran et al. |
| 2007/0091997 A1 | 4/2007 | Fogg et al. |
| 2007/0140333 A1 | 6/2007 | Chono et al. |
| 2007/0140354 A1 | 6/2007 | Sun |
| 2007/0147497 A1 | 6/2007 | Bao et al. |
| 2007/0160126 A1 | 7/2007 | Van Der Meer et al. |
| 2007/0160138 A1 | 7/2007 | Wedi et al. |
| 2007/0160151 A1 | 7/2007 | Bolton et al. |
| 2007/0177808 A1 | 8/2007 | Ando |
| 2007/0189626 A1 | 8/2007 | Tanizawa et al. |
| 2007/0201553 A1 | 8/2007 | Shindo |
| 2007/0223579 A1 | 9/2007 | Bao |
| 2007/0230565 A1 | 10/2007 | Tourapis et al. |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1* | 10/2007 | Zuo ............ H04N 19/176 375/240.2 |
| 2007/0258518 A1* | 11/2007 | Tu ............ H04N 19/176 375/240.03 |
| 2007/0258519 A1 | 11/2007 | Srinivasan |
| 2007/0268964 A1 | 11/2007 | Zhao |
| 2007/0297508 A1 | 12/2007 | Kobayashi |
| 2008/0008249 A1 | 1/2008 | Yan |
| 2008/0008394 A1 | 1/2008 | Segall |
| 2008/0013630 A1 | 1/2008 | Li et al. |
| 2008/0024513 A1 | 1/2008 | Raveendran |
| 2008/0031346 A1 | 2/2008 | Segall |
| 2008/0068446 A1 | 3/2008 | Barkley et al. |

(56) References Cited

U.S. PATENT DOCUMENTS

| | | | |
|---|---|---|---|
| 2008/0080615 | A1 | 4/2008 | Tourapis et al. |
| 2008/0089410 | A1 | 4/2008 | Lu et al. |
| 2008/0089417 | A1 | 4/2008 | Bao et al. |
| 2008/0095235 | A1 | 4/2008 | Hsiang |
| 2008/0101465 | A1 | 5/2008 | Chono et al. |
| 2008/0144951 | A1 | 6/2008 | Zhang |
| 2008/0165848 | A1 | 7/2008 | Ye et al. |
| 2008/0187042 | A1 | 8/2008 | Jasinschi |
| 2008/0192822 | A1 | 8/2008 | Chang et al. |
| 2008/0240235 | A1 | 10/2008 | Holcomb et al. |
| 2008/0240250 | A1 | 10/2008 | Lin et al. |
| 2008/0240257 | A1 | 10/2008 | Chang et al. |
| 2008/0260278 | A1 | 10/2008 | Zuo et al. |
| 2008/0304562 | A1 | 12/2008 | Chang et al. |
| 2009/0003718 | A1 | 1/2009 | Liu et al. |
| 2009/0067503 | A1 | 3/2009 | Jeong et al. |
| 2009/0161756 | A1 | 6/2009 | Lin |
| 2009/0207912 | A1 | 8/2009 | Holcomb |
| 2009/0207919 | A1 | 8/2009 | Yin et al. |
| 2009/0213930 | A1 | 8/2009 | Ye et al. |
| 2009/0219994 | A1 | 9/2009 | Tu et al. |
| 2009/0245587 | A1 | 10/2009 | Holcomb et al. |
| 2009/0262798 | A1 | 10/2009 | Chiu et al. |
| 2009/0290635 | A1 | 11/2009 | Kim et al. |
| 2009/0296808 | A1 | 12/2009 | Regunathan et al. |
| 2010/0128786 | A1 | 5/2010 | Gao et al. |
| 2010/0177826 | A1 | 7/2010 | Bhaumik et al. |
| 2012/0020409 | A1 | 1/2012 | Chang et al. |
| 2012/0224627 | A1 | 9/2012 | Srinivasan |
| 2012/0269266 | A1 | 10/2012 | Lin et al. |
| 2014/0233638 | A1 | 8/2014 | Tu et al. |
| 2014/0294070 | A1 | 10/2014 | Regunathan et al. |
| 2015/0043633 | A1 | 2/2015 | Regunathan et al. |

FOREIGN PATENT DOCUMENTS

| | | |
|---|---|---|
| CN | 1526236 | 9/2004 |
| CN | 1622611 | 6/2005 |
| CN | 1647541 | 7/2005 |
| CN | 1672177 | 9/2005 |
| CN | 1917647 | 2/2007 |
| CN | 105812815 | 7/2016 |
| CN | 105847826 | 8/2016 |
| EP | 0331094 | 9/1989 |
| EP | 0932306 | 7/1999 |
| EP | 1465349 | 10/2004 |
| EP | 1871113 | 12/2007 |
| GB | 897363 | 5/1962 |
| GB | 1218015 | 1/1971 |
| JP | H01-221084 | 9/1989 |
| JP | H04-079687 | 3/1992 |
| JP | 05-227525 | 9/1993 |
| JP | H06-086264 | 3/1994 |
| JP | H06-189287 | 7/1994 |
| JP | 07-222145 | 8/1995 |
| JP | 07-250327 | 9/1995 |
| JP | 08-336139 | 12/1996 |
| JP | 09-200758 | 7/1997 |
| JP | 10-174106 | 6/1998 |
| JP | 10-336656 | 12/1998 |
| JP | 11-041610 | 2/1999 |
| JP | 2000-013794 | 1/2000 |
| JP | 2001-008215 | 1/2001 |
| JP | 2001-016594 | 1/2001 |
| JP | 2001-358948 | 12/2001 |
| JP | 2002-058029 | 2/2002 |
| JP | 2002-518899 | 6/2002 |
| JP | 2003-502889 | 1/2003 |
| JP | 2003061090 | 2/2003 |
| JP | 2003-520513 | 7/2003 |
| JP | 2003-230142 | 8/2003 |
| JP | 2004-007650 | 1/2004 |
| JP | 2004-007788 | 1/2004 |
| JP | 2004-023288 | 1/2004 |
| JP | 2004-056249 | 2/2004 |
| JP | 2004-194076 | 7/2004 |
| JP | 2004-247889 | 9/2004 |
| JP | 6-296275 | 10/2004 |
| JP | 2004-535126 | 11/2004 |
| JP | 2005-524304 | 8/2005 |
| JP | 2005-236990 | 9/2005 |
| JP | 2005-260467 | 9/2005 |
| JP | 2007-520165 | 7/2007 |
| JP | 2007-195146 | 8/2007 |
| JP | 2007-281949 | 10/2007 |
| JP | 2007-312340 | 11/2007 |
| JP | 2008-005337 | 1/2008 |
| JP | 2008-099045 | 4/2008 |
| JP | 2011-514056 | 4/2011 |
| JP | 2011-524130 | 8/2011 |
| KR | 132895 | 10/1998 |
| KR | 10-2003-0068140 | 8/2003 |
| KR | 10-2004-0045907 | 6/2004 |
| KR | 10-2006-0105407 | 10/2006 |
| KR | 10-2006-0105409 | 10/2006 |
| RU | 2119269 | 9/1998 |
| RU | 2119727 | 9/1998 |
| RU | 2127962 | 3/1999 |
| WO | WO 93/09636 | 5/1993 |
| WO | WO 94/03988 | 2/1994 |
| WO | WO 97/21302 | 6/1997 |
| WO | WO 98/10594 | 3/1998 |
| WO | WO 99/25121 | 5/1999 |
| WO | WO 99/48300 | 9/1999 |
| WO | WO 00/21207 | 4/2000 |
| WO | WO 00/72599 | 11/2000 |
| WO | WO 02/007438 | 1/2002 |
| WO | WO 02/080575 | 10/2002 |
| WO | WO 03/092297 | 11/2003 |
| WO | WO 04/100554 | 11/2004 |
| WO | WO 04/100556 | 11/2004 |
| WO | WO 2005/036886 | 4/2005 |
| WO | WO 05/065030 | 7/2005 |
| WO | WO 05/076614 | 8/2005 |
| WO | WO 2005/072312 | 8/2005 |
| WO | WO 06/075895 | 7/2006 |
| WO | WO 2006/079997 | 8/2006 |
| WO | WO 06/112620 | 10/2006 |
| WO | WO 2006/104363 | 10/2006 |
| WO | WO 2007/008286 | 1/2007 |
| WO | WO 2007/009875 | 1/2007 |
| WO | WO 2007/015047 | 2/2007 |
| WO | WO 2007/018669 | 2/2007 |
| WO | WO 2007/042365 | 4/2007 |
| WO | WO 2007/104266 | 9/2007 |
| WO | WO 07/130580 | 11/2007 |
| WO | WO 2009/105732 | 8/2009 |
| WO | WO 2009/158113 | 12/2009 |

OTHER PUBLICATIONS

Notice of Allowance dated Jun. 14, 2017, from Korean Patent Application No. 10-2010-7027143, 6 pp.

Office Action dated May 19, 2017, from Mexican Patent Application No. MX/a/2016/014505, 2 pp. [English translation not available].

Summons to attend oral proceedings pursuant to Rule 115(1) EPC dated Apr. 3, 2017, from European Patent Application No. 14000799.8, 7 pp.

Appeal Decision to Grant a Patent dated Feb. 12, 2015, from Japanese Patent Application No. 2011-512545, 3 pp.

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

Augustine et al., "Region of Interest Editing of MPEG-2 Video Streams in the Compressed Domain," *2004 IEEE Int'l Conf. on Multimedia and Expo: ICME'04*, vol. 1, Issue 27-30, pp. 559-562 (Jun. 2004).

Bist et al., "Adaptive Quantization for Low Bit Rate Video Coding," *Proc. 1998 Int'l Conf. on Image Processing (ICIP 98)*, pp. 925-928 (Oct. 1998).

(56) References Cited

OTHER PUBLICATIONS

Calderbank et al., "Wavelet transforms that map integers to integers," Mathematics Subject Classification, Aug. 1996, 39 pages.
Chai et al., "Face Segmentation Using Skin-Color Map in Videophone Applications," *IEEE Transaction on Circuits and Systems for Video Technology*, vol. 9, No. 4, pp. 551-564, Jun. 1999.
Chang et al., "Adaptive Wavelet Thresholding for Image Denoising and Compression," *IEEE Trans on Image Processing*, vol. 9, No. 9, pp. 1532-1546 (Sep. 2000).
Chrysafis et al., "Context-based Adaptive Image Coding," *Proc. of the 30th Asilomar Conf. on Signals, Systems, and Computers*, 5 pp. (Nov. 1996).
Communication dated Sep. 17, 2013, from European Patent Application No. 09770648.5, 4 pp.
Communication pursuant to Article 94(3) EPC dated Feb. 11, 2016, from European Patent Application No. 14000799.8, 5 pp.
Communication pursuant to Article 94(3) EPC dated Jun. 7, 2016, from European Patent Application No. 09770648.5, 6 pp.
Correia et al., "Classification of Video Segmentation Application Scenarios," *IEEE Transactions on Circuits and Systems for Video Technology*, vol. 14, No. 5, pp. 735-741, May 2004.
Daly et al., "Face-Based Visually-Optimized Image Sequence Coding," *1998 International Conference on Image Processing*, vol. 3, pp. 443-447, Oct. 1998.
De Simone, et al., "A comparative study of JPEG 2000, AVC/H.264, and HD Photo," *SPIE Optics and Photonics, Applications of Digital Image Processing XXX*, 12 pp. (Aug. 2007).
Donoho et al., "Data compression and Harmonic Analysis," *IEEE transaction on information theory*, vol. 44, No. 6, Oct. 1998, pp. 2435-2476.
Eleftheriadis et al., "Dynamic Rate Shaping of Compressed Digital Video," *IEEE Transactions on Multimedia*, vol. 8, No. 2, Apr. 2006, pp. 297-314.
Extended European Search Report dated Jul. 29, 2014, from European Patent Application No. 14000799, 7 pp.
Farvardin et al., "Optimum quantizer performance for a class of non-Gaussian memoryless sources," *IEEE Trans. Inform. Theory*, vol. IT-30, No. 3, pp. 485-497 (May 1984).
Flierl et al., "A Video Codec Incorporating Block-Based Multi-Hypothesis Motion-Compensated Prediction," in *Proceedings of the SPIE Conference on Visual Communications and Image Processing*, Perth, Australia, vol. 4067, pp. 238-249 (Jun. 2000).
Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).
Foos et al., "JPEG 2000 compression of medical imagery," *Proc. SPIE*, vol. 3980, pp. 85-96 (Feb. 2000).
France Telecom et al., "KTA 1.8 Software Manual," ITU-T COM 16-C410-E, 18 pp. (Apr. 2008).
Garrigues et al., "Atom position coding in a matching pursuit based video coder," *Lecture Notes in Computer Science*, 4 pp. (Sep. 2005).
Gavrilescu et al., "Embedded Multiple Description Scalar Quantizers," *IEE Electronics Letters*, vol. 39, No. 13, 12 pp. (Jun. 2003).
Gish et al., "Asymptotically efficient quantizing," *IEEE Trans. Inform. Theory*, vol. IT-14, No. 5 (Sep. 1968).
Golner et al., "Region Based Variable Quantization for JPEG Image Compression," *IEEE Symp. on Circuits and Systems*, pp. 604-607 (Aug. 2000).
Golston et al., "Video codecs tutorial: Trade-offs with H.264, VC-1 and other advanced codecs," *Video/Imaging Design Line*, 9 pp. (Mar. 2006).
"H.264 & IPTV Over DSL—Enabling New Telco Revenue Opportunities," *White Paper*, 12 pp. (May 15, 2004).
Hannuksela et al., "Sub-picture: ROI coding and unequal error protection," Proc. 2002 Int'l Conf. on Image Processing, vol. 3, Issue 24-28, pp. 537-540 (Jun. 2002).
International Search Report of the International Searching Authority, dated Nov. 1, 2007, for International Patent Application No. PCT/US2007/010848.

International Search Report and Written Opinion of the International Searching Authority, dated Jan. 14, 2010, for International Patent Application No. PCT/US2009/045659, 11 pp.
"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).
"ISO/IEC 13818-2. Generic coding of moving pictures and associated audio information," MPEG (Moving Pictures Expert Group), International Organization for Standardization, MPEG2 Video, 23 pp. (Dec. 2000).
ISO/IEC, "14496-2: Information Technology—Coding of Audio-Visual Objects—Part 2: Visual," 724 pp. (Jun. 2004).
ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).
ITU-T, "ITU-T Recommendation H.261: Video Codec for Audio-visual Services at p x 64 kbits," 28 pp. (Mar. 1993).
ITU-T, "ITU-T Recommendation H.262: Information Technology—Generic Coding of Moving Pictures and Associated Audio Information: Video," 218 pp. (Jul. 1995).
ITU-T, "ITU-T Recommendation H.263: Video Coding for Low Bit Rate Communication," 167 pp. (Feb. 1998).
ITU-T, "CCITT Recommendation T.81: Information Technology—Digital Compression and Coding of Continuous-Tone Still Images—Requirements and Guidelines," 190 pp. (Sep. 1992).
ITU-T, "ITU-T Recommendation T.84: Terminals for Telematic Services—Information Technology—Digital Compression and Coding of Continuous-Tone Still Images: Extensions," 84 pp. (Jul. 1996).
ITU-T, "ITU-T Recommendation T.801: JPEG 2000 image coding system: Extensions," 334 pp. (Aug. 2002).
Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).
Joshi et al., "Comparison of generalized Gaussian and Laplacian modeling in DCT image coding," *IEEE Signal Proc. Letters*, vol. SPL-2, No. 5, pp. 81-82 (May 1995).
Karczewicz et al., "Rate Distortion Optimized Quantization," JVT-AA026, 8 pp. (Apr. 2008).
Kim et al., "Still image coding based on vector quantization and fractal approximation," *IEEE Transactions on Image Processing*, vol. 5, No. 4, pp. 587-597 (Apr. 1996).
Kopp, "Lossless Wavelet Based Image Compression with Adaptive 2D Decomposition," *Proc. 4th Int'l Conf. in Central Europe on Computer Graphics and Visualization 96*, pp. 141-149 (Feb. 12-16, 1996).
Kuhn, "Algorithms, Complexity Analysis and VLSI Architectures for MPEG-4 Motion Estimation, Passage," *Kluwer Academic Publications*, 18 pages (Jan. 1, 2001).
Lam et al., "A mathematical analysis of the DCT coefficient distributions for images," *IEEE Trans. Image Proc.*, vol. IP-9, No. 10, pp. 1661-1666 (Oct. 2000).
Lee et al., "Spatio-Temporal Model-Assisted Compatible Coding for Law and Very Low Bitrate Videotelephony," *3rd IEEE International Conference on Image Processing*, 4 pages, Sep. 1996.
LeGall, "MPEG: A Video Compression Standard for Multimedia Application," *Communications of the ACM*, vol. 34, No. 4, pp. 47-58 (Apr. 1991).
LeGall, "The MPEG Video Compression Algorithm," *Signal Processing: Image Communication 4*, vol. 4, No. 2, pp. 129-140 (Apr. 1992).
LeGall et al., "Transmission of HDTV signals under 140 Mbit/s using a subband decomposition and Discrete Cosine Transform coding," in *Signal Processing of HDTV*, Elsevier, Amsterdam, pp. 287-293 (Oct. 1988).
Lei et al., "Rate Adaptation Transcoding for Precoded Video Streams," 13 pp. (month unknown, 2000).
Limb, "A Picture-Coding Algorithm for the Merli Scan," *IEEE Transactions on Communications*, pp. 300-305 (Apr. 1973).

(56) References Cited

OTHER PUBLICATIONS

Lin et al, "Low-complexity face-assisted coding scheme for low bit rate video telephony," *IEICE Trans. Inf. & Sys.*, vol. E86-D, No. 1, pp. 101-108 (Jan. 2003).
Lin et al, "Low-complexity face-assisted video coding," *Proc. 2000 Int'l Conf. on Image Processing*, vol. 2, pp. 207-210 (Sep. 2000).
Liu et al., "Workload Characterization and Cost-Quality Tradeoffs in MPEG-4 Decoding on Resource-Constrained Devices," *IEEE Workshop on Embedded Systems for Real-Time Multimedia*, pp. 129-134 (Jan. 2005).
Lloyd, "Least squares quantization in PCM," *IEEE Trans. Inform. Theory*, vol. IT-28, No. 2, pp. 7-12 (Mar. 1982) (reprint of work originally presented in Jul. 1957).
Loomis, "Using the Advanced Settings of the Windows Media Video 9 Advanced Profile Codec," 13 pp. (Document dated Apr. 2006) [Downloaded from the World Wide Web on May 31, 2007].
Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).
Luo et al., "A Scene Adaptive and Signal Adaptive Quantization for Subband Image and Video Compression Using Wavelets," *IEEE Trans. on Circuits and Systems for Video Tech.*, vol. 7, No. 2, pp. 343-357 (Apr. 1997).
Malah, "Time-Domain Algorithms for Harmonic Reduction and Time Scaling of Speech Signals," *IEEE Transactions on Acoustics, Speech, and Signal Processing*, vol. ASSP-27, No. 2, Apr. 1979, 13 pages.
Mallat, "A theory for multiresolution signal decomposition: the wavelet representation," *IEEE Trans. Pattern Anal. and Machine Intell.*, vol. PAMI-11, No. 7, pp. 674-692 (Jul. 1989).
Man et al., "Three-Dimensional Subband Coding Techniques for Wireless Video Communications," *IEEE Trans. on Circuits and Systems for Video Technology*, vol. 12, No. 6, pp. 386-397 (Jun. 2002).
Marcellin et al., "An overview of quantization in JPEG 2000," *Signal Processing: Image Communication*, vol. 17, pp. 73-84 (Jan. 2002).
Masala et al., "Perceptually Optimized MPEG Compression of Synthetic Video Sequences," *Proc. ICIP*, pp. I-601-I-604 (Sep. 2005).
Max, "Quantizing for minimum distortion," *IEEE Trans. Inform. Theory*, vol. IT-6, No. 1, pp. 7-12 (Mar. 1960).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mitra et al., "Two-Stage Color Palettization for Error Diffusion," *Proceedings of SPIE*, pp. 207-217 (Jun. 2002).
Mook, "Next-Gen Windows Media Player Leaks to the Web," *BetaNews*, 17 pp. (Jul. 19, 2002) [Downloaded from the World Wide Web on Aug. 8, 2003].
Muller, "Distribution shape of two-dimensional DCT coefficients of natural images," *IEE Electronics Letters*, vol. 29, No. 22 (Oct. 1993).
Murakami et al., "Comparison between DPCM and Hadamard transform coding in the composite coding of the NTSC color TV signal," *IEEE Trans. on Commun.*, vol. COM-30, No. 3, pp. 469-479 (Mar. 1982).
Musmann et al., "Advances in Picture Coding," *Proceedings of the IEEE*, vol. 73, No. 4, pp. 523-548 (Apr. 1985).
Neff et al., "Modulus Quantization for Matching Pursuit Video Coding," *IEEE Transactions on Circuits and Systems for Video Technology*, vol. 10, No. 6, pp. 895-912 (Sep. 2000).
Nguyen et al., "Set Theoretic Compression with an Application to Image Coding," *IEEE Transactions on Image Processing*, vol. 7, No. 7, pp. 1051-1056 (Jul. 1998).
Notice of Allowance dated Mar. 30, 2016, from Japanese Patent Application No. 2013-122385, 4 pp.
Notice of Allowance dated Jul. 5, 2016, from Mexican Patent Application No. MX/a/2014/002291, 2 pp.

Notice of Final Rejection dated Jul. 18, 2016, from Korean Patent Application No. 10-2010-7027143, 4 pp.
Notice of Final Rejection dated Oct. 17, 2016, from Korean Patent Application No. 10-2016-7007437, 5 pp.
Notice on Grant dated Jun. 14, 2013, from corresponding Chinese Patent Application No. 200980121348.3, 4 pp.
Notice of Preliminary Rejection dated Oct. 19, 2015, from Korean Patent Application No. 10-2010-7027143, 5 pp.
Notice of Preliminary Rejection dated Apr. 18, 2016, from Korean Patent Application No. 10-2016-7007437, 5 pp.
Notice of Reason for Rejection dated Jul. 22, 2015, from Japanese Patent Application No. 2013-122385, 6 pp.
Notice on the First Office Action dated Oct. 18, 2012, from Chinese Patent Application No. 200980121348.3, 8 pp.
Notice on the First Office Action and Search Report dated Feb. 2, 2016, from Chinese Patent Application No. 201310362221.9, 13 pp.
Office action dated Dec. 11, 2012, from Japanese Patent Application No. 2011-512545, 6 pp.
Office action dated Oct. 31, 2013, from Japanese Patent Application No. 2011-512545, 4 pp.
Office action dated Jun. 3, 2014, from Japanese Patent Application No. 2013-122385, 15 pp.
Office action dated Aug. 28, 2013, from Mexican Patent Application No. MX/a/2010/012818, 3 pp.
Office action dated Feb. 6, 2014, from Mexican Patent Application No. MX/a/2010/012818, 2 pp.
Office Action dated Dec. 2, 2016, from Korean Patent Application No. 10-2010-7027143, 3 pp.
Park et al., "A post processing method for reducing quantization effects in low bit-rate moving picture coding," *IEEE Trans. Circuits Syst. Video Technology*, vol. 9, pp. 161-171 (Feb. 1999).
Pre-trial Report dated Jun. 16, 2014, from Japanese Patent Application No. 2011-512545, 4 pp.
Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).
Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).
Reininger et al., "Distribution of two-dimensional DCT coefficients for images," *IEEE Trans. on Commun.*, vol. COM-31, No. 6, pp. 835-839 (Jun. 1983).
Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).
Richardson, *H.264 and MPEG-4 Video Compression*, pp. 50-56 and 187-196 (2003).
Schallauer et al., "PRESTO—Preservation Technologies for European Broadcast Archives, D5.4—High Quality Compression for Film and Video," 80 pp. (Sep. 18, 2002).
Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).
Sethuraman et al., "Model Based Multi-Pass Macroblock-Level Rate Control for Visually Improved Video Coding," *IEEE Proc. of Workshop and Exhibition on MPEG-4*, pp. 59-62 (Jun. 2001).
Shanableh et al., "Heterogeneous Video Transcoding to Lower Spatio-Temporal Resolutions and Different Encoding Formats," *IEEE Transactions on Multimedia*, vol. 2, No. 2, pp. 101-110 (Jun. 2000).
Shen et al., "Rate-Distortion Optimization for Fast Hierarchical B-Picture Transcoding," *IEEE*, pp. 5279-5282 (May 2006).
Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).
Sony Electronics Inc., "Sony Vizaro DVD Encoder System DVA-V700," 4 pp. (Apr. 2001).
Srinivasan et al., "HD Photo: A new image coding technology for digital photography," *Proc. of SPIE*, vol. 6696, 19 pp. (Jan. 2007).

(56) References Cited

OTHER PUBLICATIONS

Sullivan, "Efficient scalar quantization of exponential and Laplacian random variables," *IEEE Trans. Inform. Theory*, vol. IT-42, No. 5, pp. 1365-1374 (Sep. 1996).
Sullivan et al., "Rate-Distortion Optimization for Video Compression," *IEEE Signal Processing Magazine*, pp. 74-90 (Nov. 1998).
Sullivan et al., "The H.264/AVC Advanced Video Coding Standard: Overview and Introduction to the Fidelity Range Extensions," 21 pp. (Aug. 2004).
Supplementary European Search Report dated Jun. 24, 2011, from European Patent Application No. 09770648.5, 12 pp.
Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).
Tong, "A perceptually adaptive JPEG coder," Thesis, University of Toronto, 124 pp. (1997).
Tong, "Region of Interest (ROI) Based Rate Control for H.236 Compatible Video Conferencing," The University of Texas at Arlington, Ph.D. Thesis, 115 pp. (Dec. 2005).
Tsang et al., "Fuzzy Based Rate Control for Real-Time MPEG Video," *IEEE Transactions on Fuzzy Systems*, pp. 504-516 (Nov. 1998).
Wang, et al., "A Framework for Adaptive Scalable Video Coding Using Wyner-Ziv Techniques," *EURASIP Journal on Applied Signal Processing*, pp. 1-18 (month unknown, 2006).
Watson, "Perceptual Optimization of DCT Color Quantization Matrices," *IEEE Conf. on Image Processing*, pp. 100-104 (Nov. 1994).
Watson et al., "Visibility of Wavelet Quantization Noise," *IEEE Trans. on Image Processing*, vol. 6, No. 8, pp. 1164-1175 (Aug. 1997).
Wiegand et al., "Joint Draft 10 of SVC Amendment," JVT-W201, 23rd meeting of Joint Video Team, San Jose, CA, pp. 74-77, 92-98, 182-185, 399-400, 19 pp. (Apr. 2007).
Wiegand et al., "Joint Draft 10 of SVC Amendment," JVT-W201, 23rd meeting of Joint Video Team, San Jose, CA, sections 7.4.2.2, 7.4.5, 8.5.8, G.7.3.6 and G.7.4.5, 19 pp. (Apr. 2007).
Wien, "Variable Block-Size Transforms for Hybrid Video Coding," Dissertation, 182 pp. (Feb. 2004).
Wu et al., "Context-Based, Adaptive, Lossless Image Coding," *IEEE Trans. Communications*, vol. 45, pp. 437-444 (Apr. 1997).
Wu et al., "Joint Estimation of Forward and Backward Motion Vectors for Interpolative Prediction of Video," *IEEE Transactions on Image Processing*, vol. 3, No. 5, pp. 684-687 (Sep. 1994).
Xiong et al., "Wavelet Packet Image Coding Using Space-Frequency Quantization," *IEEE Transactions on Image Processing*, vol. 7, No. 6, pp. 892-898 (Jun. 1998).
Yang et al., "Rate Control for Videophone Using Local Perceptual Cues," *IEEE Transactions on Circuits and Systems for Video Tech.*, vol. 15, No. 4, pp. 496-507 (Apr. 2005).
Yoo et al., "Adaptive Quantization of Image Subbands with Efficient Overhead Rate Selection," *IEEE Conf. on Image Processing*, pp. 361-364 (Sep. 1996).
Yuen et al., "A survey of hybrid MC/DPCM/DCT video coding distortions," *Signal Processing*, vol. 70, pp. 247-278 (Nov. 1998).
Zaid et al., "Wavelet Image Coding with Adaptive Thresholding," 4 pp. (Jul. 2002).
Zhang et al., "Adaptive Field/Frame Selection for High Compression Coding," *SPIE Conf. on Image and Video Communications and Processing*, 13 pp. (Jan. 2003).
Zhike et al., "Adaptive Quantization Scheme for Very Low Bit Rate Video Coding," *Proceedings of Asia-Pacific Conference on Communications and Optoelectronics and Communications Conference*, pp. 940-943 (Oct. 18, 1999).
Notice of Allowance dated Mar. 2, 2017, from Korean Patent Application No. 10-2016-7007437, 6 pp.
Notice of Allowance dated Nov. 7, 2014, from Mexican Patent Application No. MX/a/2010/012818 (No English translation available), 1 p.

Ahmed et al., "Discrete Cosine Transform," *IEEE Trans. on Computers*, vol. C-23, No. 1, pp. 90-93 (Jan. 1974).
Braun et al., "Motion-Compensating Real-Time Format Converter for Video on Multimedia Displays," *Proc. IEEE Int'l Conf. on Image Processing*, vol. 1, pp. 125-128 (Oct. 1997).
Chisu, "Techniques for Accelerating Intensity-Based Rigid Image Registration," Thesis dated Jan. 15, 2005.
Clarke, "Image and Video Compression: A Survey," *Wiley InterScience Journal Abstract*, 2 pp., http://www.3.interscience.wiley.com [Downloaded from the World Wide Web on Jan. 25, 2006].
Communication dated May 24, 2013, from European Patent Application No. 07794559.0, 9 pp.
Communication pursuant to Article 94(3) EPC dated Aug. 25, 2017, from European Patent Application No. 07794559.0, 7 pp.
Decision on Grant dated Aug. 30, 2012, from Russian Patent Application No. 2008143599, 20 pp.
Decision on Grant dated Jan. 9, 2017, from Russian Patent Application No. 2012156159, 12 pp.
Defee et al., "Nonlinear filters in image pyramid generation," *IEEE Int'l Conf. on Systems Engineering*, pp. 269-272 (Aug. 1991).
Elad et al., "Super-Resoluation Restoration of an Image Sequence—Adaptive Filtering Approach," *IEEE Trans. on Image Processing*, pp. 1-24 (Apr. 2001).
"Embedded Zerotree Wavelet (EZW)," 13 pp.
European Search Report dated Oct. 24, 2018, from European Patent Application No. 18187252.4, 8 pp.
Examination Report dated Nov. 27, 2015, from Indian Patent Application No. 5843/CHENP/2008, 4 pp.
Examination Report dated Jul. 22, 2016, from European Application No. 07755274.3, 6 pages.
Examiner's First Report dated Jun. 4, 2010, from Australian Patent Application No. 2007248524, 2 pp.
Examiner's report No. 2 dated Feb. 15, 2012, from Australian Patent Application No. 2007248524, 2 pp.
Examiner's Report dated Jun. 4, 2014, from Canadian Patent Application No. 2,647,332, 2 pp.
Examiner's Report and Examination Search Report dated Mar. 12, 2015, from Canadian Patent Application No. 2,647,332, 3 pp.
Examiner's Report and Examination Search Report dated Jan. 25, 2016, from Canadian Patent Application No. 2,647,332, 5 pp.
Examiner's Report and Examination Search Report dated Jun. 29, 2016, from Canadian Patent Application No. 2,647,332, 4 pp.
Extended European Search Report for European application No. 07755268.5, 18 pages, Dec. 19, 2013.
Extended European Search Report for European application No. 07755274.3, 10 pages, Aug. 20, 2015.
"A Fast Precise Implementation of 8x8 Discrete Cosine Transform Using the Streaming SIMD Extensions and MMX™ Instructions," Version 1.0, 25 pp. (Apr. 1999).
Final Decision of Rejection dated Sep. 19, 2018, from Japanese Patent Application No. 2016-232784, 6 pp.
Final Office Action dated Mar. 13, 2009, from U.S. Appl. No. 10/846,140, 13 pp.
Final Office Action dated Aug. 19, 2010, from U.S. Appl. No. 11/137,924, 17 pp.
Final Office Action dated Dec. 21, 2010, from U.S. Appl. No. 11/400,719, 12 pp.
Final Office Action dated May 25, 2011, from U.S. Appl. No. 11/400,739, 32 pp.
Final Office Action dated Dec. 10, 2010, from U.S. Appl. No. 11/400,741, 21 pp.
Final Office Action dated Oct. 29, 2010, from U.S. Appl. No. 11/400,744, 8 pp.
Final Office Action dated Mar. 11, 2011, from U.S. Appl. No. 11/400,785, 19 pp.
Final Office Action dated Aug. 1, 2011, from U.S. Appl. No. 11/418,690, 23 pp.
Final Office Action dated Aug. 6, 2012, from U.S. Appl. No. 11/787,945, 22 pp.
Final Office Action dated Feb. 7, 2012, from U.S. Appl. No. 11/810,346, 9 pp.
Final Office Action dated Oct. 24, 2011, from U.S. Appl. No. 12/156,864, 18 pp.

(56) References Cited

OTHER PUBLICATIONS

Final Office Action dated Oct. 22, 2013, from U.S. Appl. No. 13/172,607, 13 pp.
First Office Action dated Mar. 23, 2010, from Chinese Patent Application No. 200780015871.9, 9 pp.
First Office Action dated Feb. 15, 2012, from Chinese Patent Application No. 201010274862.5, 6 pp.
Haddad et al., *Digital Signal Processing—Theory, Applications, and Hardware*, pp. 257-261 (Jan. 1991).
Hsia et al., "A Parallel Median Filter with Pipelined Scheduling for Real-Time 1D and 2D Signal Processing," *IEICE Trans. Fundamentals*, vol. E83-A, No. 7, pp. 1396-1404 (Jul. 2000).
Huang et al., "A Frame-Based MPEG Characteristics Extraction Tool and Its Application in Video Transcoding," *IEEE Transactions on Consumer Electronics*, vol. 48, No. 3, pp. 522-532 (Aug. 2002).
Impoco, "JPEG2000—a Short Tutorial," 16 pp. (2004).
International Search Report and Written Opinion dated Sep. 14, 2007, for International Patent Application No. PCT/US2007/008944, 7 pp.
ISO/IEC, "10918-1: CCITT Recommendation T.81: Digital Compression and Coding of Continuous Tone Still Images," pp. 337-547 (1992).
Ji et al., "Three-Dimensional Subband Scalable Video Coding Embedded with H.264/AVC Codec," *Proc. SPIE*, vol. 5960, pp. 201-209 (Jul. 2005).
"JPEG 2000 Standardization Moving Quickly," ISO/IEC JTC/SC29/WG1 N1861, Coding of Still Pictures, Press Release, 2 pp. (Aug. 2000).
Kingsbury, "Use of Laplacian PDFs in Image Compression," 5 pp. (2003).
Kotropoulos et al., "Adaptive LMS L-filters for noise suppression in images," *Proc. IEEE Trans. on Image Processing*, vol. 5, Issue 12, pp. 1596-1609 (1996).
Kwon et al., "Adaptive Bitrate Allocation in Spatial Scalable Video Coding of Fixed Total Bitrate," *IEICE Trans. Fundamentals*, vol. E81-A, Issue 5, pp. 950-956 (May 1998).
Marshall, "The Discrete Cosine Transform," 4 pp. (document dated Oct. 4, 2001) [downloaded from the World Wide Web on Mar. 30, 2006].
Martinez-Fonte et al., "An Empirical Study on Corner Detection to Extract Buildings in Very High Resolution Satellite Images," *IEEE-ProRisc*, Veldhoven, The Netherlands, pp. 288-293 (Nov. 2004).
Munsil et al., "DVD Benchmark—Special Report, The Chroma Upsampling Error and the 4:2:0 Interlaced Chroma Problem," downloaded from the World Wide Web, pp. 1-19 (Apr. 2000).
Nadenau, "Integration of Human Color Vision Models into High Quality Image Compression," Ph.D. Thesis, pp. 1-216 (2000).
Notice of Allowance dated Oct. 30, 2012, from corresponding Mexican Patent Application No. MX/a/2008/013647 (English translation not available), 1 p.
Notice of Allowance dated Sep. 29, 2014, from Korean Patent Application No. 10-2008-7026543 (no English translation available), 2 pp.
Notice of Allowance dated Jun. 11, 2014, from Japanese Patent Application No. 2013-077198 (No English translation available), 3 pp.
Notice of Allowance dated Nov. 1, 2016, from Japanese Patent Application No. 2014-142106, 4 pp.
Notice of Allowance dated Jan. 18, 2017, from Canadian Patent Application No. 2,647,332, 1 p.
Notice on Grant dated Feb. 26, 2016, from Chinese Patent Application No. 201210297902.7, 6 pp.
Notice of Preliminary Rejection dated Jun. 28, 2013, from Korean Patent Application No. 10-2008-7026543, 4 pp.
Notice of Preliminary Rejection dated Dec. 17, 2013, from Korean Patent Application No. 10-2008-7026543, 3 pp.
Notice of Preliminary Rejection dated Apr. 29, 2014, from Korean Patent Application No. 10-2008-7026543, 4 pp.
Notice of Rejection dated Oct. 2, 2012, from Japanese Patent Application No. 2009-509744, 9 pp.
Notice of Reason for Rejection dated Sep. 3, 2015, from Japanese Patent Application No. 2014-142106, 7 pp.
Notice of Reason for Rejection dated Jun. 1, 2016, from Japanese Patent Application No. 2014-142106, 7 pp.
Notice of Reason for Rejection dated Nov. 6, 2017, from Japanese Patent Application No. 2016-232784, 10 pp.
Notice on the First Office Action dated Apr. 21, 2010, from Chinese Patent Application No. 200780012030.2, 7 pp.
Notice on the First Office Action dated Apr. 21, 2010, for Chinese Patent Application No. 200780012500.5, 9 pp.
Notice on the Second Office Action dated Sep. 29, 2010, from Chinese Patent Application No. 2007/0012500.5, 7 pp.
Notice on the First Office Action and Search Report dated Jul. 17, 2014, from Chinese Patent Application No. 201210297902.7, 14 pp.
Notice on the Second Office Action dated Jan. 18, 2011, from Chinese Patent Application No. 200780015871.9, 8 pp.
Notice on the Third Office Action dated Feb. 3, 2012, from Chinese Patent Application No. 200780015871.9, 9 pp.
Notice on the Second Office Action dated Mar. 10, 2015, from Chinese Patent Application No. 201210297902.7, 8 pp.
Notice on the Third Office Action and Search Report dated Aug. 26, 2015, from Chinese Patent Application No. 201210297902.7, 15 pp.
Notice on the First Office Action dated Apr. 16, 2018, from Chinese Patent Application No. 201610301837.9, 12 pp.
Notice on the First Office Action dated May 23, 2018, from Chinese Patent Application No. 201610301806.3, 12 pp.
Notice on the First Office Action dated May 25, 2018, from Chinese Patent Application No. 201610301862.7, 12 pp.
Notice on the Second Office Action dated Jul. 19, 2018, from Chinese Patent Application No. 201610301837.9, 8 pp.
Office action dated Mar. 28, 2011, from Mexican Patent Application No. MX/a/2008/013647, 2 pp.
Office action dated Mar. 9, 2012, from Mexican Patent Application No. MX/a/2008/013647 (no English translation), 2 pp.
Office action dated Jan. 29, 2012, from Israeli Patent Application No. 194133, 2 pp.
Office Action dated Dec. 27, 2011, from U.S. Appl. No. 11/787,945, 20 pp.
Office Action dated Jul. 10, 2008, from U.S. Appl. No. 10/846,140, 9 pp.
Office Action dated Sep. 28, 2009, from U.S. Appl. No. 10/846,140, 11 pp.
Office Action dated Nov. 27, 2013, from Korean Patent Application No. 10-2008-7024241, 4 pp.
Office Action dated May 27, 2013, from Korean Patent Application No. 10-2008-7024241, 4 pp.
Office Action dated May 27, 2013, from Korean Patent Application No. 10-2008-7024247, 4 pp.
Office Action dated Jan. 14, 2011, from U.S. Appl. No. 11/137,924, 13 pp.
Office Action dated Feb. 8, 2012, from U.S. Appl. No. 11/137,924, 13 pp.
Office Action dated Apr. 30, 2010, from U.S. Appl. No. 11/137,924, 11 pp.
Office Action dated Mar. 29, 2011, from U.S. Appl. No. 11/400,719, 11 pp.
Office Action dated Jul. 20, 2010, from U.S. Appl. No. 11/400,719, 10 pp.
Office Action dated Aug. 3, 2012, from U.S. Appl. No. 11/400,739, 29 pp.
Office Action dated Nov. 15, 2010, from U.S. Appl. No. 11/400,739, 28 pp.
Office Action dated May 25, 2010, from U.S. Appl. No. 11/400,739, 24 pp.
Office Action dated Apr. 14, 2011, from U.S. Appl. No. 11/400,741, 19 pp.
Office Action dated May 26, 2010, from U.S. Appl. No. 11/400,741, 17 pp.
Office Action dated Jun. 30, 2010, from U.S. Appl. No. 11/400,744, 9 pp.
Office Action dated Oct. 27, 2010, from U.S. Appl. No. 11/400,785, 16 pp.

(56) References Cited

OTHER PUBLICATIONS

Office Action dated Nov. 29, 2010, from U.S. Appl. No. 11/400,788, 17 pp.
Office Action dated Feb. 19, 2013, from U.S. Appl. No. 11/418,690, 21 pp.
Office Action dated Nov. 16, 2010, from U.S. Appl. No. 11/418,690, 22 pp.
Office Action dated Jul. 29, 2011, from U.S. Appl. No. 11/673,516, 29 pp.
Office Action dated Jul. 13, 2011, from U.S. Appl. No. 11/676,263, 19 pp.
Office Action dated Jan. 23, 2012, from U.S. Appl. No. 11/728,702, 6 pp.
Office Action dated Sep. 29, 2011, from U.S. Appl. No. 11/728,895, 22 pp.
Office Action dated Jul. 13, 2012, from U.S. Appl. No. 11/728,895, 23 pp.
Office Action dated Oct. 28, 2011, from U.S. Appl. No. 11/731,851, 9 pp.
Office Action dated Apr. 10, 2012, from U.S. Appl. No. 11/731,851, 8 pp.
Office Action dated Aug. 16, 2011, from U.S. Appl. No. 11/810,346, 8 pp.
Office Action dated Nov. 1, 2011, from U.S. Appl. No. 12/080,406, 7 pp.
Office Action dated Mar. 24, 2011, from U.S. Appl. No. 12/156,864, 17 pp.
Office Action dated May 8, 2013, from U.S. Appl. No. 13/172,607, 11 pp.
Office Action dated Jan. 3, 2012, from U.S. Appl. No. 13/248,784, 10 pp.
Office Action dated Feb. 4, 2013, from U.S. Appl. No. 13/539,730, 5 pp.
Office Action dated Dec. 27, 2016, from U.S. Appl. No. 14/263,584, 11 pp.
Office Action dated Mar. 17, 2016, from U.S. Appl. No. 14/307,282, 10 pp.
Office Action dated Oct. 5, 2018, from U.S. Appl. No. 15/973,264, 23 pp.
Office Action dated Sep. 6, 2011, from Japanese Patent Application No. 2009-504355, 3 pp.
Office Action dated Sep. 9, 2011, from Japanese Patent Application No. 2009-504358, 5 pp.
Office Action dated May 28, 2013, from Japanese Patent Application No. 2012-021885, 7 pp.
Official Action dated Oct. 3, 2011, from Russian Patent Application No. 2008143599, 4 pp. (no English translation available).
Official Action dated Mar. 3, 2014, from Japanese Patent Application No. 2013-077198, 11 pp.
Official Action dated Apr. 26, 2016, from Russian Patent Application No. 2012156159, 6 pp.
Official Action dated Aug. 10, 2016, from Russian Patent Application No. 2012156159, 5 pp.
Orton-Jay et al., "Encoding for Blu-ray Disc and HD DVD—Reaping the Benefits of Integrated Mastering," Sonic Digital Vision, pp. 1-22 (Apr. 2007).
Ranka et al., "Efficient Serial and Parallel Algorithm for Median Filtering," *Trans. on Signal Processing*, vol. 39, Issue 6, pp. 1462-1466 (Jun. 1991).
Reeves, "On the Selection of Median Structure for Image Filtering," *IEEE Trans. on Circuits and Systems II: Analog and Digital Signal Processing*, vol. 42, pp. 556-558 (Aug. 1995).
Russ, *The Image Processing Handbook*, 2nd Edition, pp. 164-166 (1994).
Santa Cruz et al., "An Analytical Study of JPEG 2000 Functionalities"/ "JPEG 2000 Still Image Coding Versus Other Standards," Proc. SPIE vol. 4115, 10 pp. (2000).

Search Report and Written Opinion from PCT/US2007/010848 dated Nov. 1, 2007.
Senel et al., "Topological Median Filters," downloaded from World Wide Web, pp. 1-44 (Apr. 2001).
Summons to attend oral proceedings dated Jun. 8, 2017, from European Patent Application No. 09770648.5, 7 pp.
Supplementary European Search Report dated Aug. 26, 2011, from European Patent Application No. 07794559.0, 13 pp.
Taubman et al., "JPEG2000: Image Compression Fundamentals, Standards and Practice," pp. 110-113 and 348-353 (2002).
Taubman et al., "Embedded Block Coding in JPEG2000," 4 pp. (2000).
Tescher, "Transform image coding," *Advances in Electronics and Electron. Physics*, Suppl. 12, Academic Press, New York, pp. 113-115 (1979).
Tomasi et al., "Bilateral Filtering for Gray and Color Images," *Proc. Int'l Conf. on Computer Vision*, pp. 1-8 (Jan. 1998).
Tramini et al., "Intraframe Image Decoding Based on a Nonlinear Variational Approach," *Int'l Journal of Imaging Systems and Technology*, vol. 9, No. 5, pp. 369-380 (Dec. 1998).
Tsekeridou et al., "Morphological Signal Adaptive Median Filter for Still Image and Image Sequence Filtering," *IEEE Int'l Symp. on Circuits and Systems*, pp. 1-4 (May 1998).
Turaga et al., "Content-Adaptive Filtering in the UMCTF Framework," *IEEE*, 4 pp. (Apr. 2003).
Tziritas et al., "A Hybrid Image Coder: Adaptive Intra-Interframe Prediction Using Motion Compensation," *Sixth MDSP Workshop*, pp. 224-230 (Sep. 1989).
van der Schaar et al., "Unconstrained Motion Compensated Temporal Filtering (UMCTF) Framework for Wavelet Video Coding," *Proc. Int'l Conf. on Multimedia and Expo*, vol. 2, 3 pp. (Apr. 2003).
van Roosmalen et al., "Noise Reduction of Image Sequences as Preprocessing for MPEG2 Encoding," *Proc. EUSIPCO*, pp. 1-4 (Sep. 1998).
"VC-1/PEP and Posterization," AVS Forum, downloaded from the World Wide Web, 13 pp. (Apr. 2007).
Wang et al., "Adaptive image matching in the subband domain," *SPIE Proc.*, 12 pp. (Dec. 2004).
Wong et al., "Nonlinear Scale-Space Filtering and Multiresolution System," *IEEE Trans. on Image Processing*, vol. 4, Issue 6, pp. 774-787 (Jun. 1995).
Yli-Harja et al., "Content-Adaptive Filtering in the UMCTF Framework," *Proc. Finnish Signal Processing Symp.*, pp. 84-88 (May 1999).
Yli-Harja et al., "Efficient Representation and Implementation of Recursive Median Filters and Their Cascade Compositions," *Signal Processing Symp.*, pp. 84-88 (May 1999).
Yli-Harja et al., "Run-length Distributions of Recursive Median Filters using Probabilistic Automata," *Proc. of Scandinavian Conf. on Image Analysis*, pp. 251-258 (Jun. 1999).
Communication under Rule 71(3) EPC dated Apr. 9, 2018, from European Patent Application No. 09770648.5, 7 pp.
Decision to Refuse dated Nov. 20, 2017, from European Patent Application No. 14000799.8, 16 pp.
Non-Final Office Action dated Mar. 24, 2011, from U.S. Appl. No. 12/156,864, 17 pp.
Non-Final Office Action dated Mar. 17, 2016, from U.S. Appl. No. 14/307,282, 10 pp.
Notice of Allowance dated Feb. 1, 2018, from Mexican Patent Application No. MX/a/2016/014505, 2 pp.
Notice on Grant of Patent dated Sep. 6, 2016, from Chinese Patent Application No. 201310362221.9, 4 pp.
Notice on Grant of Patent dated Feb. 2, 2019, from Chinese Patent Application No. 201610301837.9, 6 pp.
Summons to Attend Oral Proceedings dated Mar. 18, 2019, from European Patent Application No. 07755274.3, 8 pp.

\* cited by examiner

```
QP_FRAME_UNIFORM (1 bit)
QP_CHANNEL_UNIFORM (1 bit)
If (QP_CHANNEL_UNIFORM == 1) {
   QP_FRAME (N bits)    //Quantization parameter for all channels.
}
Else {
   QP_FRAME_Y (N bits)  //Quantization parameter for Y channel.
   QP_FRAME_U (N bits)  //Quantization parameter for U channel.
   QP_FRAME_V (N bits)  //Quantization parameter for V channel.
}
```

Figure 11

```
If (IS_LEFT_NEIGHBOR && IS_TOP_NEIGHBOR && QP_LEFT == QP_TOP) {
   QP_PRED = QP_LEFT
}
Else {
   QP_PRED = QP_FRAME
}
```

Figure 12

```
If (QP_FRAME_UNIFORM == 0) {
  If (QP_CHANNEL_UNIFORM)
    NUM_BITS_QP_MB (3 bits)
  Else {
    NUM_BITS_QP_MB_Y (3 bits)
    NUM_BITS_QP_MB_U (3 bits)
    NUM_BITS_QP_MB_V (3 bits)
  }
}
```

Figure 13

```
If (QP_FRAME_UNIFORM == 0) {
  QP_SKIP (1 bit)
  If (QP_SKIP == 0) {
    If (QP_CHANNEL_UNIFORM)
      DIFF_QP_MB (NUM_BITS_QP_MB bits)   //QP for all channels for this MB.
    Else {
      DIFF_QP_MB_Y (NUM_BITS_QP_MB_Y bits)   //QP for Y channel for this MB.
      DIFF_QP_MB_U (NUM_BITS_QP_MB_U bits)   //QP for U channel for this MB.
      DIFF_QP_MB_V (NUM_BITS_QP_MB_V bits)   //QP for V channel for this MB.
      }
    }
}
```

Figure 14

```
If (QP_FRAME_UNIFORM == 0) {
  If (QP_CHANNEL_UNIFORM) {
    NUM_QP_INDEX (3 bits)
    NUM_QP = NUM_QP_INDEX + 2
    QP_MB_TABLE[0] = QP_FRAME
    for (i = 1; i < NUM_QP; i++) {
      QP_INDEX_MB(8 bits)
      QP_MB_TABLE[i] = QP_INDEX_MB
    }
  }
  Else {
    NUM_QP_INDEX_Y (3 bits)
    NUM_QP_INDEX_U (3 bits)
    NUM_QP_INDEX_V (3 bits)
    NUM_QP_Y = NUM_QP_INDEX_Y + 2
    QP_MB_Y[0] = QP_FRAME_Y
    for (i = 1; i < NUM_QP_Y; i++) {
      QP_INDEX_MB_Y(8 bits)
      QP_MB_TABLE_Y[i] = QP_INDEX_MB_Y
    }
    NUM_QP_U = NUM_QP_INDEX_U + 2
    QP_MB_U[0] = QP_FRAME_U
    for (i = 1; i < NUM_QP_U; i++) {
      QP_INDEX_MB_U(8 bits)
      QP_MB_TABLE_U[i] = QP_INDEX_MB_U
    }
    NUM_QP_V = NUM_QP_INDEX_V + 2
    QP_MB_V[0] = QP_FRAME_V
    for (i = 1; i < NUM_QP_V; i++) {
      QP_INDEX_MB_V(8)
      QP_MB_TABLE_V[i] = QP_INDEX_MB_V
    }
  }
}
```

Figure 15

```
QP_SKIP (1 bit)
If (QP_SKIP != 1) {
  If (QP_CHANNEL_UNIFORM) {
    NUM_QP_EFFECTIVE = NUM_QP - 1
    QP_ID = 0
    If (NUM_QP_EFFECTIVE > 1)
      QP_ID (x bits)  //vlc coded using table of size NUM_QP_EFFECTIVE
    QP_PRED_ID = ID_of(QP_PRED)
    If (QP_ID >= QP_PRED_ID)
      QP_ID++;
    QP_MB = QP_MB_TABLE[QP_ID]
  }
  else {    // QP_CHANNEL_UNIFORM == 0
    NUM_QP_EFFECTIVE = NUM_QP_Y - 1
    QP_ID = 0
    If (NUM_QP_EFFECTIVE > 1)
      QP_ID (x bits)  //vlc coded using table of size NUM_QP_EFFECTIVE for Y
    QP_PRED_Y_ID = ID_of(QP_PRED_Y)
    If (QP_ID >= QP_PRED_Y_ID)
      QP_ID++;
    QP_MB_Y = QP_MB_TABLE_Y[QP_ID]
    NUM_QP_EFFECTIVE = NUM_QP_U - 1
    QP_ID = 0
    If (NUM_QP_EFFECTIVE > 1)
      QP_ID (x bits)  //vlc coded using table of size NUM_QP_EFFECTIVE for U
    QP_PRED_U_ID = ID_of(QP_PRED_U)
    If (QP_ID >= QP_PRED_U_ID)
      QP_ID++;
    QP_MB_U = QP_MB_TABLE_U[QP_ID]
    NUM_QP_EFFECTIVE = NUM_QP_V
    QP_ID = 0
    If (NUM_QP_EFFECTIVE > 1)
      QP_ID (x bits)  //vlc coded using table of size NUM_QP_EFFECTIVE for V
    QP_PRED_V_ID = ID_of(QP_PRED_V)
    If (QP_ID >= QP_PRED_V_ID)
      QP_ID++;
    QP_MB_V = QP_MB_TABLE_V[QP_ID]
  }
}
```

Figure 16

| QP_ID | VLC |
|---|---|
| 0 | 0 |
| 1 | 1 |

Figure 17A  1700

| QP_ID | VLC |
|---|---|
| 0 | 0 |
| 1 | 10 |
| 2 | 11 |

Figure 17B  1705

| QP_ID | VLC |
|---|---|
| 0 | 0 |
| 1 | 10 |
| 2 | 110 |
| 3 | 111 |

Figure 17C  1710

| QP_ID | VLC |
|---|---|
| 0 | 0 |
| 1 | 10 |
| 2 | 110 |
| 3 | 1110 |
| 4 | 1111 |

Figure 17D  1715

| QP_ID | VLC |
|---|---|
| 0 | 0 |
| 1 | 10 |
| 2 | 110 |
| 3 | 1110 |
| 4 | 11110 |
| 5 | 11111 |

Figure 17E  1720

| QP_ID | VLC |
|---|---|
| 0 | 0 |
| 1 | 10 |
| 2 | 110 |
| 3 | 1110 |
| 4 | 11110 |
| 5 | 111110 |
| 6 | 111111 |

Figure 17F  1725

ADAPTIVE QUANTIZATION FOR ENHANCEMENT LAYER VIDEO CODING

CROSS REFERENCE TO RELATED APPLICATIONS

This application is a continuation of U.S. patent application Ser. No. 14/307,282, filed Jun. 17, 2014, which is a continuation of U.S. patent application Ser. No. 12/156,864, filed Jun. 3, 2008, now U.S. Pat. No. 8,897,359, the disclosure of which is hereby incorporated by reference.

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

Generally, much of the bit rate reduction from compression is achieved through quantization. According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, with or without dead zone, and adaptive or non-adaptive quantization.

In many implementations, an encoder performs quantization essentially as a biased division of an original data value by a quantization factor. One or more quantization parameters (QPs) indicate the quantization factor for purposes of inverse quantization of the data value. For inverse quantization, often implemented as a multiplication operation, an encoder or decoder reconstructs a version of the data value using the quantization factor indicated by the QP(s). Quantization typically introduces loss in fidelity to the original data value, which can show up as compression errors or artifacts in the results of decoding.

Most scalable video codecs split video into a base layer and an enhancement layer. The base layer alone provides a reconstruction of the video at a lower quality level and/or a lower resolution, and the enhancement layer can be added to provide extra information that will increase the video quality. Many single-layer digital video coding standards today allow for QPs to vary spatially in the base layer. This feature allows encoding to adapt to the macroblock characteristics and thus achieve better perceptual quality for a given rate.

While the above described techniques provide acceptable performance in some instances of scalable video coding, none of them provide the advantages and benefits of the techniques and tools described below.

SUMMARY

In summary, the detailed description presents techniques and tools for scalable encoding and decoding of enhancement layer video using a spatially variable quantization. The quantization may be variable for an entire picture of the enhancement layer video or separately variable for each color channel in the enhancement layer video for the picture. The techniques and tools improve the performance of a general-purpose video encoder when it encodes an enhancement layer of video pictures.

In some embodiments, a tool such as an encoder encodes enhancement layer video for a picture organized in multiple color channels (e.g., a luma ("Y") channel and two chroma ("U" and "V") channels). The tool selectively varies quantization spatially over the frame, and in some cases the tool selectively varies quantization spatially and also varies quantization between the multiple color channels of the enhancement layer video for the picture. The tool outputs encoded enhancement layer video for the picture in a bitstream, signaling QP information. The QP information indicates QPs that at least in part parameterize the varied quantization of the enhancement layer video for the picture.

For corresponding decoding, a tool such as a decoder decodes enhancement layer video for a picture organized in multiple color channels. The tool receives encoded enhancement layer video for the picture in a bitstream, receiving QP information indicating QPs that at least in part parameterize varied quantization of the enhancement layer video for the picture. During inverse quantization, the tool accounts for quantization that varies spatially over the frame and between the multiple color channels of the enhancement layer video for the picture.

In other embodiments, a tool such as a video decoder receives encoded information for video for a picture from a bitstream. The encoded information includes QP selection information for a current unit of the video for the picture. When the tool decodes the current unit, the tool predicts a QP for the current unit using one or more QPs for spatially neighboring units of the video for the picture. The tool then selects between the predicted QP and another QP using the QP selection information, and uses the selected QP in reconstruction of the current unit. In some implementations, the tool decodes different information for predicted QPs for each color channel.

For corresponding encoding, a tool such as an encoder signals encoded information for video for a picture from a bitstream. The encoded information includes QP selection information for a current unit of the video for the picture. When the tool encodes the current unit, after determining a QP for the current unit, the tool encodes the QP selection information. The tool predicts a QP for the current unit using one or more QPs for spatially neighboring units of the video for the picture. If the predicted QP is the actual QP for the current unit, the QP selection information so indicates. Otherwise, the QP selection information indicates another QP for the current unit.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 11 is a pseudocode listing illustrating bitstream syntax for signaling/receiving information that indicates frame QP and channel QPs in first and second example combined implementations.

FIG. 12 is a pseudocode listing illustrating an example QP prediction rule in the first and second example combined implementations.

FIG. 13 is a pseudocode listing illustrating bitstream syntax for signaling/receiving information that indicates number of bits used for macroblock-level differential QP information in the first example combined implementation.

FIG. 14 is a pseudocode listing illustrating bitstream syntax for signaling/receiving QP selection information in the first example combined implementation.

FIG. 15 is pseudocode listing illustrating bitstream syntax for signaling/receiving information that indicates how to populate a table of QP values in the second example combined implementation.

FIG. 16 is a pseudocode listing illustrating bitstream syntax for signaling/receiving QP selection information in the second example combined implementation.

FIGS. 17A-F are VLC tables used for QP selection information in the second example combined implementation.

DETAILED DESCRIPTION

Figure 1:
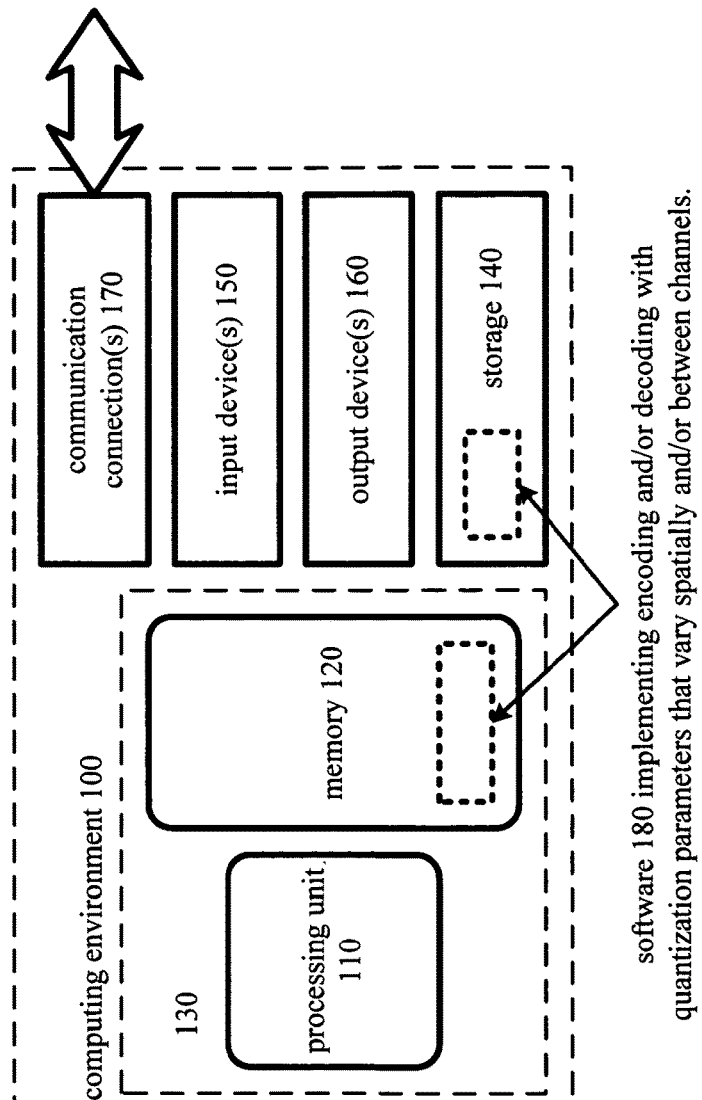
FIG. 1 is a block diagram of a suitable computing environment in which several described embodiments may be implemented.

Techniques and tools for adapting quantization spatially and from color channel-to-channel are described herein. Depending on implementation, adapting quantization spatially and across color channels of enhancement layer video can help improve scalable video coding performance in several respects, especially for high-fidelity encoding of high bit depth video.

Many base layer video encoders adapt quantization spatially. When enhancement layer video represents quality differences between reconstructed base layer video and the original video, the energy of the signal in the enhancement layer can vary roughly in proportion to the strength of adaptive quantization in the base layer. Adapting quantization of the enhancement layer video spatially helps improve encoding performance for the enhancement layer video.

Spatially adapting quantization of enhancement layer video can have other advantages. In some scalable video encoding/decoding systems, certain areas of enhancement layer video are predicted from base layer video, while other areas of the enhancement layer video are predicted from previously reconstructed enhancement layer video, for example, using motion compensation. Using different levels of quantization in the different areas of the enhancement layer video can improve performance by allowing the encoder to adapt to the characteristics of the different areas.

Adapting quantization between color channels of enhancement layer video can also improve performance. Different video formats can use samples in different color spaces such as RGB, YUV and YCbCr. For YUV or YCbCr, Y represents the brightness (luma) channel of video, and U and V, or Cb and Cr, represent the color (chroma) channels of the video. The human eye is, in general, more sensitive to variations in brightness than color, so encoders have been developed to take advantage of this fact by reducing the resolution of the chroma channels relative to the luma channel. In the YUV color space, one chroma sampling rate is 4:4:4 which indicates that for every luma sample, a corresponding U sample and a V sample are present. Another chroma sampling rate is 4:2:2, which indicates that a single U sample and a single V sample correspond to two horizontal luma samples. Chroma sampling rates at lower resolution, such as 4:2:2 or 4:2:0, result in fewer chroma samples and typically require fewer bits to encode than higher resolution chroma sample rates, such as 4:4:4. Aside from different resolutions in different channels due to chroma sampling, each color channel in the video may be quantized to a different level of fidelity in the base layer video.

Some scalable video encoders encode base-layer video a low chroma sampling rate (e.g., 4:2:0) and/or fidelity, and encode enhancement-layer video at a higher chroma sampling rate (e.g., 4:2:2 or 4:4:4). The chroma channels of the enhancement layer video may thus have different signal energies than the luma channel. Using different levels of quantization in the different channels of the enhancement layer video can improve performance by allowing the encoder to adapt to the characteristics of the channels.

In some implementations, part or all of enhancement layer video can be remapped to a lower chroma resolution for encoding/decoding with a base layer video encoder/decoder. Adapting quantization between channels can help in this situation too. For example, if the base layer video is a tone-mapped version of the enhancement layer video, using different QPs for the luma channel, as compared to the chroma channels, can improve performance.

Techniques and tools for efficiently encoding and signaling QP values are also described herein. For example, one method of encoding and signaling QP values for enhancement layer video includes using QP prediction to exploit inter-unit, spatial redundancy in QP values. In many scenarios, this helps reduce the cost of signaling QPs for units of a picture or a color channel of the picture, where a unit is a block, macroblock, segment, or some other type of unit. Spatial QP prediction can be used in conjunction with a simple mechanism to signal whether or not quantization varies spatially over picture, or across the color channels in the picture.

Some of the techniques and tools described herein address one or more of the problems noted in the background. Typically, a given technique/tool does not solve all such problems. Rather, in view of constraints and tradeoffs in encoding time, encoding resources, decoding time, decoding resources and/or quality, the given technique/tool improves encoding and/or performance for a particular implementation or scenario.

I. Computing Environment.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder with one or more of the described techniques and tools for enhancement layer video coding and/or decoding using QPs that vary spatially and/or across the color channels of a picture.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the video encoder and/or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "produce" and "encode" to describe computer operations in a computing environment. These terms are high-level abstractions for operations performed by a computer, and should not be confused with acts performed by a human being. The actual computer operations corresponding to these terms vary depending on implementation.

II. Exemplary Encoding Tool.

Figure 2:
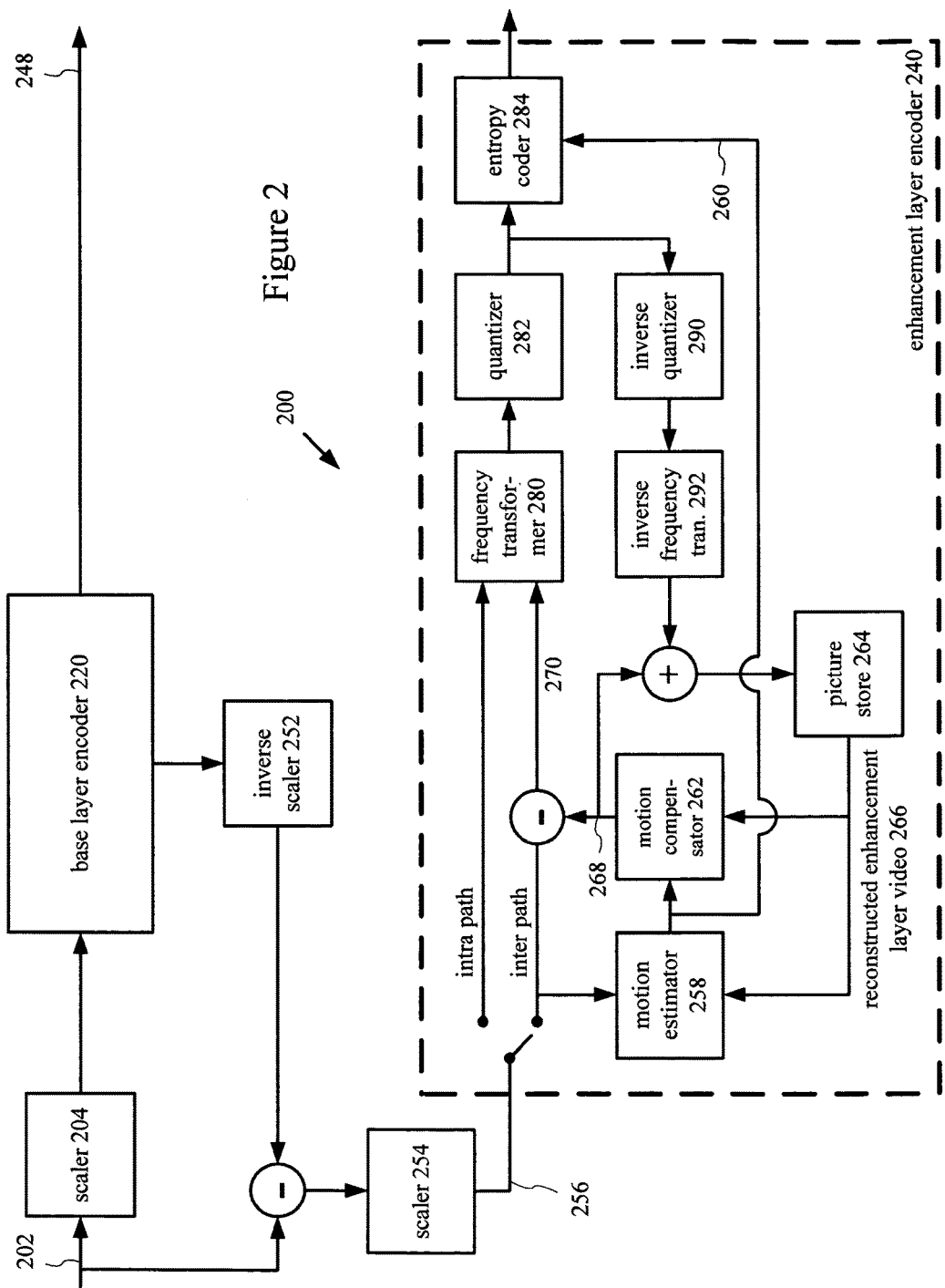
FIG. 2 is a block diagram of an exemplary encoding system for encoding a picture of enhancement layer video quantized with one or more QPs that vary spatially and/or across color channels of the picture.

FIG. 2 is a block diagram of an encoding tool (200) for encoding input video as a base layer and an enhancement layer in conjunction with which some described embodiments may be implemented. For the base layer, the format of the base layer bit stream (248) can be a Windows Media Video or VC-1 format, MPEG-x format (e.g., MPEG-1, MPEG-2, or MPEG-4), H.26x format (e.g., H.261, H.262, H.263, or H.264), or other format.

The tool (200) processes video pictures. The term "picture" generally refers to source, coded, or reconstructed image data. For progressive video, a picture is a progressive video frame. For interlaced video, a picture may refer to an interlaced video frame, the top field of the frame, or the bottom field of the frame, depending on context. The generic term "picture" will be used to represent these various options.

The encoding tool includes a first scaler (204) which accepts input video pictures (202) and outputs base layer video to a base layer encoder (220). The first scaler (204) may downsample or otherwise scale the input video pictures (202), for example, to reduce sample depth, spatial resolution or chroma sampling resolution. Or, in some instances, the first scaler upsamples the input video pictures (202) or does not alter the input video pictures (202) at all.

The base layer encoder (220) encodes the base layer video and outputs a base layer bit stream (248), and additionally makes available reconstructed base layer video which is input to an inverse scaler (252). If the reconstructed base layer video has a different bit depth, spatial resolution, chroma sampling rate, etc. than the input video pictures (202) due to scaling, then the inverse scaler (252) may upsample (or otherwise inverse scale) the reconstructed base layer video so that it has the same resolution as the input video pictures (202).

The input video pictures (202) are compared against the reconstructed base layer video to produce enhancement layer video that is input to a second scaler (254). The second scaler (254) may or may not be the same physical component or software program as the first scaler (204). The second scaler (254) outputs the enhancement layer video (256) to an enhancement layer encoder (240).

Figure 3:
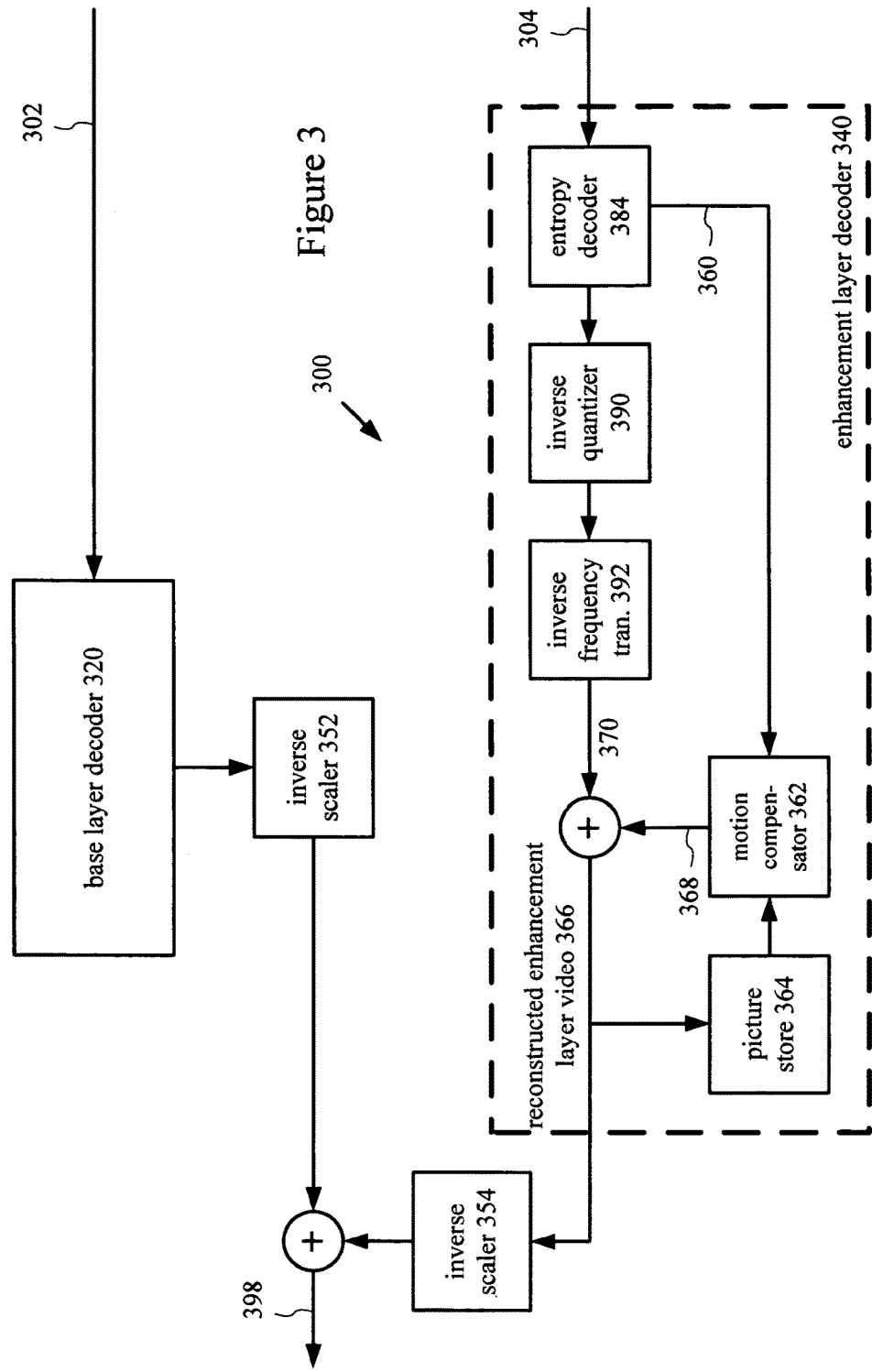
FIG. 3 is a block diagram of an exemplary decoding system for decoding a picture of enhancement layer video quantized with one or more QPs that vary spatially and/or across color channels of the picture.

The enhancement layer encoder (240) compresses inter-coded, predicted "pictures" (256) of the enhancement layer video and intra-coded "pictures" (256) of the enhancement layer video. The "picture" at a given time in the enhancement layer video represents differences between an input video picture and a reconstructed base layer video picture, but is still encoded as a picture by the example encoder (240). For the sake of presentation, FIG. 3 shows a path for intra-coded content through the enhancement layer encoder (240) and a path for inter-coded predicted content. Many of the components of the enhancement layer encoder (240) are used for compressing both intra-coded content and inter-coded, predicted content. The exact operations performed by those components can vary depending on the type of information being compressed. Although FIG. 2 shows a single enhancement layer encoder (240), the enhancement layer video (256) can itself be separated into multiple layers of residual video for encoding with separate residual encoders. Generally, the enhancement layer video (256) that is encoded represents differences (but not necessarily all differences) between the reconstructed base layer video and the input video.

In general, within the encoder (240), inter-coded, predicted content (as a picture) is represented in terms of prediction from previously reconstructed content (as one or more other pictures, which are typically referred to as reference pictures or anchors). For example, content at a given time is encoded as a progressive P-frame or B-frame, interlaced P-field or B-field, or interlaced P-frame or B-frame. Within the encoder (240), a prediction residual is the difference between predicted information and corresponding original enhancement layer video.

If the enhancement layer video (256) content is encoded as a predicted picture, a motion estimator (258) estimates motion of macroblocks or other sets of samples of the enhancement layer video picture with respect to one or more reference pictures, which represent previously reconstructed enhancement layer video content. The picture store (264) buffers reconstructed enhancement layer video (266) as a reference picture. When multiple reference pictures are used, the multiple reference pictures can be from different temporal directions or the same temporal direction. The motion estimator (258) outputs motion information (260) such as motion vector information.

The motion compensator (262) applies motion vectors to the reconstructed enhancement layer video content (266) (stored as reference picture(s)) when forming a motion-compensated current picture (268). The difference (if any) between a block of the motion-compensated enhancement layer video (268) and corresponding block of the original enhancement layer video (256) is the prediction residual (270) for the block. During later reconstruction of the enhancement layer video, reconstructed prediction residuals are added to the motion compensated enhancement layer video (268) to obtain reconstructed content closer to the original enhancement layer video (256). In lossy compression, however, some information is still lost from the original enhancement layer video (256). Alternatively, a motion estimator and motion compensator apply another type of motion estimation/compensation.

A frequency transformer (280) converts spatial domain video information into frequency domain (i.e., spectral, transform) data. For block-based video content, the frequency transformer (280) applies a DCT, variant of DCT, or other forward block transform to blocks of the samples or prediction residual data, producing blocks of frequency transform coefficients. Alternatively, the frequency transformer (280) applies another conventional frequency transform such as a Fourier transform or uses wavelet or sub-band analysis. The frequency transformer (280) may apply an 8×8, 8×4, 4×8, 4×4 or other size frequency transform.

A quantizer (282) then quantizes the blocks of transform coefficients. The quantizer (282) applies non-uniform, scalar quantization to the spectral data with a step size that varies spatially on a picture-by-picture basis, macroblock-by-macroblock basis or other basis. Additionally, in some cases the quantizer varies quantization across color channels of the enhancement layer video picture. The quantizer (282) can also apply another type of quantization, for example, a uniform or adaptive quantization for at least some spectral data coefficients, or directly quantizes spatial domain data in an encoder system that does not use frequency transformations.

When a reconstructed enhancement layer video picture is needed for subsequent motion estimation/compensation, an inverse quantizer (290) performs inverse quantization on the quantized spectral data coefficients. An inverse frequency transformer (292) performs an inverse frequency transform, producing blocks of reconstructed prediction residuals (for predicted enhancement layer video content) or samples (for intra-coded residual video content). If the enhancement layer video (256) was motion-compensation predicted, the reconstructed prediction residuals are added to the motion-compensated predictors (268) to form the reconstructed enhancement layer video. The picture store (264) buffers the reconstructed enhancement layer video for use in subsequent motion-compensated prediction.

The entropy coder (284) compresses the output of the quantizer (282) as well as certain side information (e.g., quantization parameter values) Typical entropy coding techniques include arithmetic coding, differential coding, Huffman coding, run length coding, LZ coding, dictionary coding, and combinations of the above. The entropy coder (284) typically uses different coding techniques for different kinds of information, and can choose from among multiple code tables within a particular coding technique.

A controller (not shown) receives inputs from various modules such as the motion estimator (258), frequency transformer (280), quantizer (282), inverse quantizer (290), and entropy coder (284). The controller evaluates intermediate results during encoding, for example, setting quantization step sizes and performing rate-distortion analysis. The controller works with modules such as the motion estimator (258), frequency transformer (280), quantizer (282), and entropy coder (284) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation. In some embodiments, the controller also receives input from an encoding session wizard interface, from another encoder application interface, or from another source to designate video as having specific content to be encoded using specific rules.

The above description explicitly addresses motion compensation for enhancement layer video. The encoder (240) additionally performs intra-compression of the enhancement layer video. In that instance, the scaler (254) provides enhancement layer video (256) to the encoder (240) and the encoder intra-compresses it as an intra-coded picture, without motion compensation. Instead, the enhancement layer video (256) is provided directly to the frequency transformer (280), quantizer (282), and entropy coder (284) and output as encoded video. A reconstructed version of the intra-coded enhancement layer video can be buffered for use in subsequent motion compensation of other enhancement layer video.

The relationships shown between modules within the encoder (240) indicate general flows of information in the encoder; other relationships are not shown for the sake of simplicity. In particular, FIG. 2 generally does not show side information indicating modes, tables, etc. used for a video sequence, picture, macroblock, block, etc. Such side information, once finalized, is sent in the output bit stream, typically after entropy encoding of the side information.

Particular embodiments of video encoders typically use a variation or supplemented version of the enhancement layer encoder (240). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Exemplary Decoding Tool.

FIG. 3 is a block diagram of a decoding system (300), including an exemplary enhancement layer decoder (340), in conjunction with which some described embodiments may be implemented. The system (300) includes a base layer decoder (320) which receives a base layer bit stream (302) and outputs reconstructed base layer video to a first inverse scaler (352). The base layer bit stream (302) can be a bit stream in a Windows Media Video or VC-1 format, MPEG-x format (e.g., MPEG-1, MPEG-2, or MPEG-4), H.26x format (e.g., H.261, H.262, H.263, or H.264), or other format. In certain embodiments, the base layer bit stream (302) is encoded using motion compensation, and thus the base layer decoder (320) includes a motion compensation loop. The first inverse scaler (352) is operable to upsample or otherwise inverse scale the reconstructed base layer video to the desired bit depth, spatial resolution, chroma sampling rate and/or other resolution of the output reconstructed video pictures (398).

The system further includes an enhancement layer decoder (340) operable to receive an enhancement layer bit stream (304). The enhancement layer bit stream (304) can be the same format as the base layer bit stream (302), or it may be a different format. The entropy decoder (384) is operable to decode elements of the bit stream that were encoded by entropy encoding methods including arithmetic coding, differential coding, Huffman coding, run length coding, LZ coding, dictionary coding, and combinations of the above. The entropy decoder (384) typically uses different decoding techniques for different kinds of information, and can choose from among multiple code tables within a particular decoding technique. The entropy decoder (384) outputs side information such as motion vector information (360) to a motion compensator (362).

An inverse quantizer (390) applies inverse quantization to some of the output of the entropy decoder (384). In certain embodiments, the inverse quantizer (390) is operable to reverse non-uniform scalar quantization with a step size that varies on a picture-by-picture basis, macroblock-by-macroblock basis, color channel-by-color channel basis, or some other basis. More generally, the inverse quantizer (390) is operable to reverse quantization applied during encoding.

An inverse frequency transformer (392) accepts the output of the inverse quantizer (390). The inverse frequency transformer (392) is operable to produce blocks of spatial domain values by applying an inverse DCT, variant of inverse DCT, or other reverse block transform to the output of the inverse quantizer (390). The inverse frequency transformer (392) may be operable to reverse an 8×8, 8×4, 4×8, 4×4 or some other size frequency transform. The inverse frequency transformer (392) outputs reconstructed values (370) for a prediction residual (in the case of inter-coded enhancement layer video content) or samples (in the case of intra-coded enhancement layer video content).

The motion vector information (360) output from the entropy decoder (384) is input to a motion compensator (362). The motion compensator (362) applies the motion vector information to previously reconstructed enhancement layer video buffered in a picture store (364) and outputs motion-compensation-predicted enhancement layer video (368).

In decoding of inter-coded enhancement layer video, the motion-compensation-predicted enhancement layer video (368) is combined with the prediction residuals (370) to form reconstructed enhancement layer video (366). The reconstructed enhancement layer video (366) is buffered by the picture store (364) (for use in subsequent motion compensation) and output from the enhancement layer decoder (340) to a second inverse scaler (354).

The enhancement layer decoder (340) may be operable to decode 8-bit video, 10-bit video, or video with some other bit depth. If the enhancement layer decoder (340) decodes 8-bit video and output video with a higher bit depth (e.g., 10-bit) is to be reconstructed, then the second inverse scaler (354) upsamples the reconstructed enhancement layer video (366) to the higher bit depth. Or, if the enhancement layer decoder (340) decodes 16-bit video and output video with a lower bit depth (e.g., 8-bit) is to be reconstructed, then the second inverse scaler (354) downsamples the reconstructed enhancement layer video (366) to the lower bit depth. The decoding tool combines the inverse scaled, reconstructed enhancement layer video output from the second inverse scaler (354) with the inverse scaled, reconstructed base layer video output by the first inverse scaler (352), to produce reconstructed video pictures (398) for the output video.

The above description explicitly addresses decoding of inter-coded enhancement layer video. The decoder (340), using intra-decoding, also decodes intra-coded enhancement layer video. In that instance, the entropy decoder (384), inverse quantizer (390), and inverse frequency transformer (392) act as previously mentioned to produce samples of the enhancement layer video, bypassing motion compensation. The reconstructed enhancement layer video (366) is buffered in a picture store (364) for use in future motion compensation.

The relationships shown between modules within the decoder (340) indicate general flows of information in the decoder; other relationships are not shown for the sake of simplicity. In particular, FIG. 3 generally does not show side information indicating modes, tables, etc. used for a video sequence, picture, macroblock, block, etc.

Particular embodiments of video decoders typically use a variation or supplemented version of the generalized decoder (340). Depending on implementation and the type of compression desired, modules of the decoder can be added, omitted, split into multiple modules, combined with other modules, and/or replaced with like modules. In alternative embodiments, decoders with different modules and/or other configurations of modules perform one or more of the described techniques.

Although FIG. 3 shows a single enhancement layer decoder (340), the enhancement layer video can itself be separated into multiple layers of residual video for encoding with separate residual encoders and signaling as multiple enhancement layer bit streams. A given decoding system includes one or more separate residual decoders for decoding one or more of the multiple enhancement layer bit streams. Generally, the enhancement layer video that is decoded represents differences (but not necessarily all differences) between the reconstructed base layer video and the original input video.

IV. Varying Quantization Spatially and Across Channels.

According to a first set of techniques and tools, an encoder varies quantization of enhancement layer video spatially and/or across color channels of a picture. For example, the encoder varies quantization from unit-to-unit for multiple units (such as macroblocks) of enhancement layer video, potentially using different quantization in different color channels for the units. The encoder signals quantization parameters that parameterize the variable quantization. A corresponding decoder varies inverse quantization of the enhancement layer video spatially and/or across color channels of a picture.

A. Generalized Encoding Technique.

Figure 4:
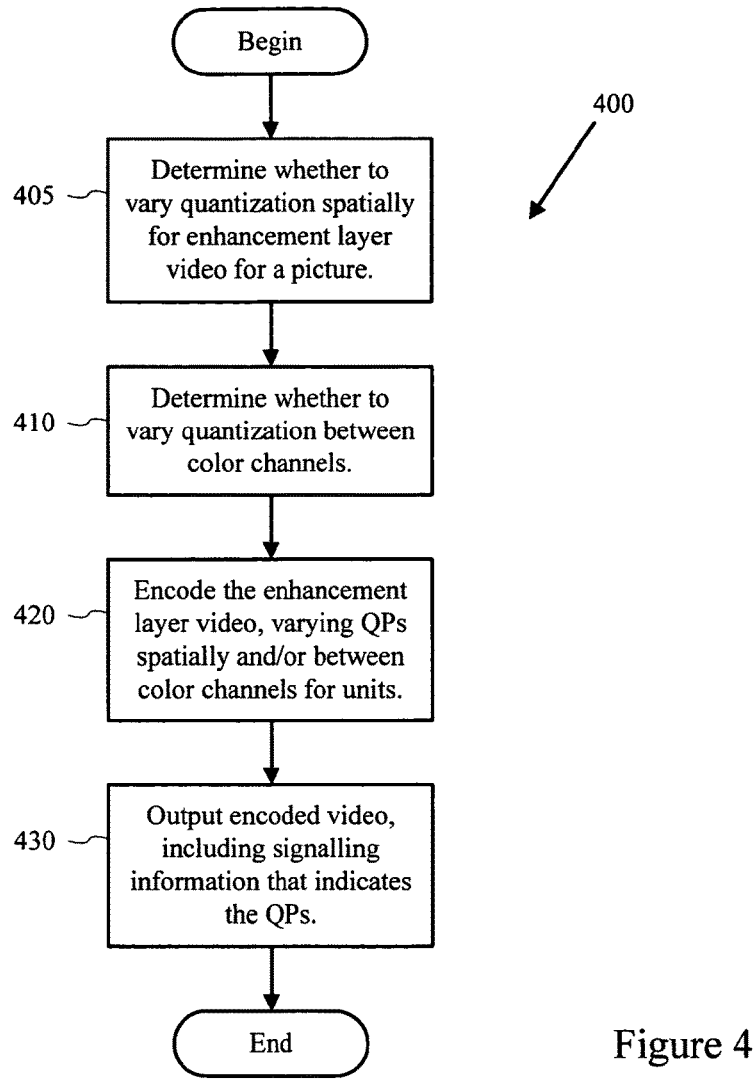
FIG. 4 is a flow chart of a generalized technique for encoding enhancement layer video quantized with one or more QPs that vary spatially and/or across color channels of a picture.

FIG. 4 shows a flow chart for a generalized technique (400) for encoding an enhancement layer video with quantization that varies spatially across a picture and/or across color channels of the picture. An encoding tool (200), such as that described with reference to FIG. 2 performs the technique (400), or some other tool may be used.

The encoding tool determines (405) whether to vary quantization spatially for a picture of enhancement layer video. This may be indicated by user input or through analysis of the picture or portions of the picture. For example, if a user desires a high degree of rate-distortion efficiency in compression, the user may direct the tool to use spatially varying QPs. Alternatively, if the picture being encoded has a high degree of complexity or spatial variance above a threshold value, then a pre-set threshold in software directs the tool to use spatially varying QPs when encoding the picture.

The tool also determines (410) whether to vary quantization between the plural color channels of the picture of enhancement layer video. The pictures can be images of various color formats (e.g., YUV or YCbCr for color space, with 4:4:4, 4:2:2 or 4:2:0 chroma sampling rate). If it is a YUV or YCbCr image, the image has a luma channel and two chroma channels. The separate channels (also called color planes or components) of the image can have different spatial resolutions. The tool may vary the QP across different color channels of the picture according to a user indication, encoder wizard setting, or through analysis of a picture, a portion of the picture, and/or one or more of the color channels.

Next, the tool encodes (420) the picture of enhancement layer video using determined QP or QPs. The tool determines one or more QPs for the picture. If the picture's QPs do not vary spatially over the picture, then only a single QP is used for the picture. If the picture's QPs do vary spatially, then a different QP is determined for each unit (e.g., macroblock, block) in the picture. Additionally, if QPs vary across the color channels of the picture, then the tool determines multiple QPs for the multiple channels, and potentially determines different QPs for each unit in the picture. For example, a different QP is determined for the luma channel and each of the chroma channels of a unit in the picture. Generally, the encoding tool applies the QP(s) to each of the units in the picture and produces an enhancement layer bit stream.

The tool outputs (430) the encoded enhancement layer bit stream, which includes information indicating the QP or QPs used. Typically, the information indicating the QP or QPs is interspersed in the bit stream with the other parameterized information for the picture or units. For example, the tool signals one or more QPs for each unit in the picture in the enhancement layer bit stream. The signaling can be done in the bit stream at the picture level or the unit level. In some implementations, the tool signals a single bit at the picture level to indicate whether QP varies spatially, and if QP varies spatially then the tool signals another bit to indicate whether QP varies across the color channels of the picture. If QP varies spatially over the picture or across the color channels of the picture, the tool signals the value(s) of the QP(s) for each of the units in the picture at the unit level of the bit stream. In this case the tool may additionally signal at the picture level how many bits are used to signal QP information for each unit at the unit level of the bit stream. Alternatively, the tool signals a table comprising different possible QP values, and then signals a selection value from the table for each of the units in the picture at the unit level in the bit stream.

The tool performs the technique (400) for a picture of enhancement layer video and repeats the technique (400) on a picture-by-picture basis. Alternatively, the tool performs the technique for a group of pictures, slice, or other section of video, and repeats the technique on that basis.

B. Exemplary Encoding Technique.

Figure 5:
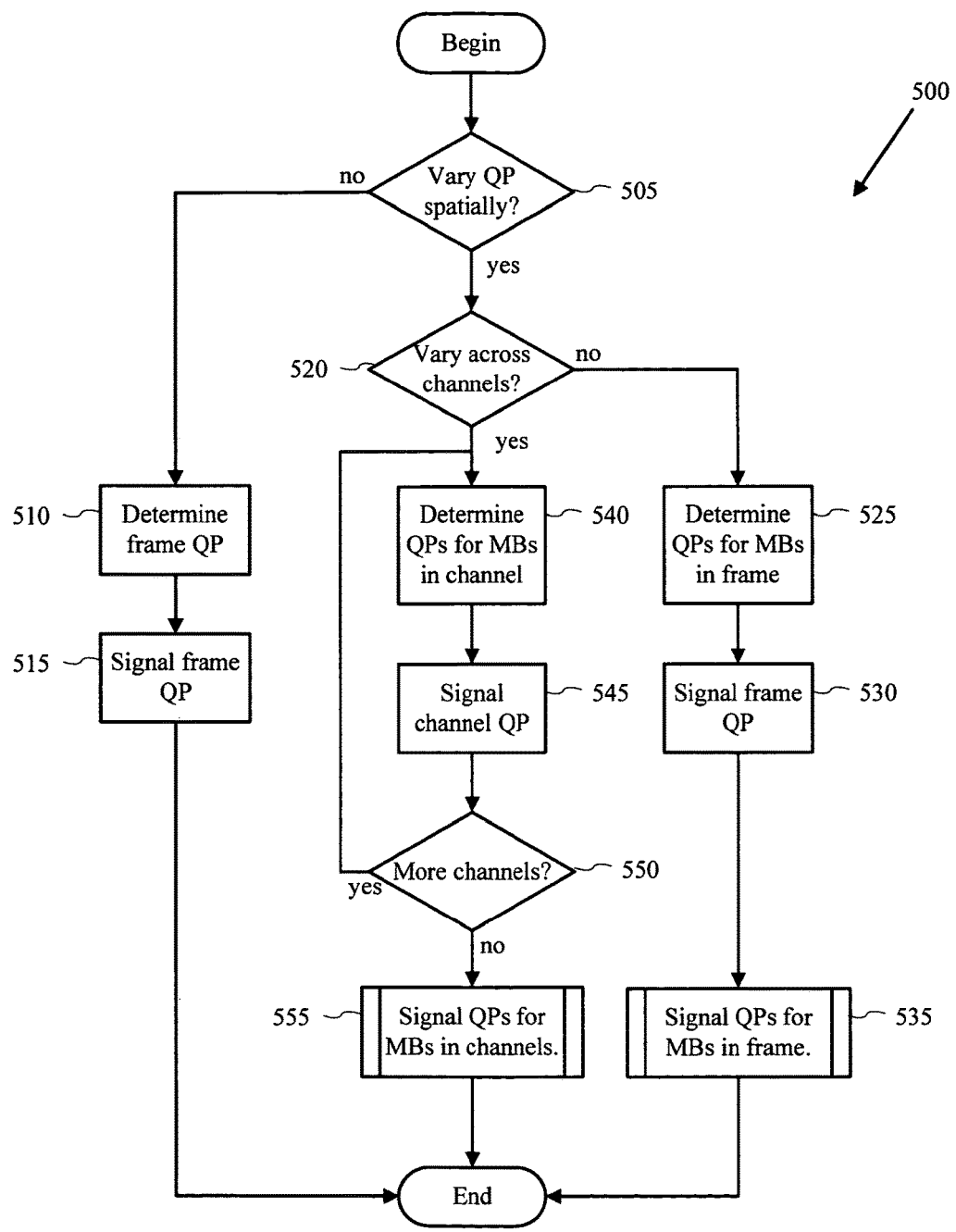
FIG. 5 is a flow chart showing an exemplary technique of determining and signaling the QPs used to encode enhancement layer video quantized with one or more QPs that vary spatially and/or across color channels of a picture.

FIG. 5 shows a flowchart of an exemplary technique (500) of encoding enhancement layer video using QPs that vary spatially or across color channels of an individual frame. An encoding tool (200), such as that described with reference to FIG. 2 is used to perform the technique (500), or some other tool may be used. The tool repeats the technique (500) on a frame-by-frame basis.

The tool first determines (505) whether QP varies spatially for the frame. The tool analyzes the frame to determine whether varying QP would be acceptable or desirable according to one or more of a number of criteria such as desired rate-distortion efficiency, compression speed, degree of complexity of the frame, or other criteria. For example, a user indicates through a user interface such as an encoding wizard that a high degree of rate-distortion efficiency is desired. The tool then determines that a spatially variable QP is necessary to achieve the desired degree of rate-distortion efficiency. Alternatively, the tool determines that the complexity of the frame is above a pre-determined or user-defined threshold and thus determines that a spatially variable QP is desired.

If the tool determines that a spatially variable QP is not desired, the tool determines (510) the frame QP according to criteria such as rate constraints of the compressed file, perceptual quality and/or complexity of the input video. The tool signals (515) the frame QP in the enhancement layer bit stream.

If the tool determines that QP does vary spatially, the tool determines (520) whether QP varies across the color channels of the frame. The tool analyzes each color channel separately or together with the other color channels to determine whether varying QP would be acceptable or desirable for each color channel, according to one or more of a number of criteria such as desired rate-distortion efficiency, compression speed, degree of complexity of the frame, complexity of each channel in the frame, amount of variance within channels and between different channels, or some other criteria.

If the tool determines that QP does not vary across the color channels, the tool determines (525) QPs to use within the frame. For example, the tool determines QPs for macroblocks in the frame according to criteria such as rate constraints, perceptual quality and/or complexity of the video for the respective macroblocks.

After the tool has determined (525) QPs within the frame, the tool signals (530) the frame QP. Generally, the frame QP is the "default" QP used when encoding each macroblock in the frame. In one example, the frame QP is an average of the QPs of the macroblocks in the frame. Alternatively, the tool determines the frame QP as the most common QP in the frame to reduce the bit cost for signaling the QPs for macroblocks. For example, the tool signals that QP varies spatially, that QP does not vary across channels, and that the frame QP is signaled using x bits, and then signals the value of the frame QP itself. Alternatively, the tool may signal that the frame QP is one of a number of entries in a given table (e.g., a QP table for a sequence), or the tool may signal the frame QP in some other manner.

The tool then signals (535) the QPs for the macroblocks in the frame. In one embodiment, this comprises signaling the QP for each of the macroblocks with respect to a predicted QP which can be either a frame QP or a QP that is predicted based on the QPs of one or more other, spatially adjacent macroblocks in the frame. In another embodiment, this comprises signaling the QP for each of the macroblocks as one of a plurality of values in a table.

If the tool determines that QP does vary both spatially and across color channels, then the tool determines (540) QPs to use within a first color channel of the frame. For example, the tool proceeds to determine QPs for macroblocks in the Y color channel according to criteria such as rate constraints, perceptual quality and/or complexity of the video for the respective macroblocks.

After the tool determines (540) the QPs for macroblocks in the channel, the tool signals (545) the frame QP for the channel. Generally, the frame QP for the channel is the "default" QP used when encoding each macroblock in the channel. In one example, the tool determines the frame QP for the channel by averaging the QPs of each of the macroblocks in the channel. In another example, the tool chooses the frame QP for the channel as the most commonly used QP in the channel. In one embodiment, signaling the frame QP for the channel comprises signaling that QP varies both spatially and across the different color channels in the frame, and then signaling the frame QP for the channel itself. Alternatively, the frame QP for the channel may be signaled as one of several values in a QP table (e.g., a QP table for a sequence).

After the tool has signaled the frame QP for the channel, the tool checks (550) whether there are other color channels in the frame that have not been analyzed, for example, the chroma (U, V) channels. If there are, then the tool performs the determining (540) step and the signaling (545) step for the frame QP for each of the other channels. Alternatively, the tool may perform the determining step (540) for the frame QP for each of the channels before the signaling step (545) for any of the channels, or the steps may be performed in some other order.

The tool next signals (555) the QPs for macroblocks for each of the channels. In one embodiment, this comprises signaling the QP for each of the macroblocks in each of the channels with respect to a predicted QP. The predicted QP can be the channel QP, or the predicted QP can be a QP based on the QPs of one or more neighboring macroblocks in the color channel. In another embodiment, the tool signals the QP of each of the macroblocks in each of the channels as one of a plurality of QP values in a table.

In some cases, each of the color channels may not vary spatially, and so the tool indicates with a skip bit that the QPs for the macroblocks in a color channel are all equal to the frame QP for the channel at some point in the encoding process, such as at the signaling step (545) or the signaling step (555).

C. QP Signaling for Macroblocks in Each Color Channel.

Figures 6A, 6B:
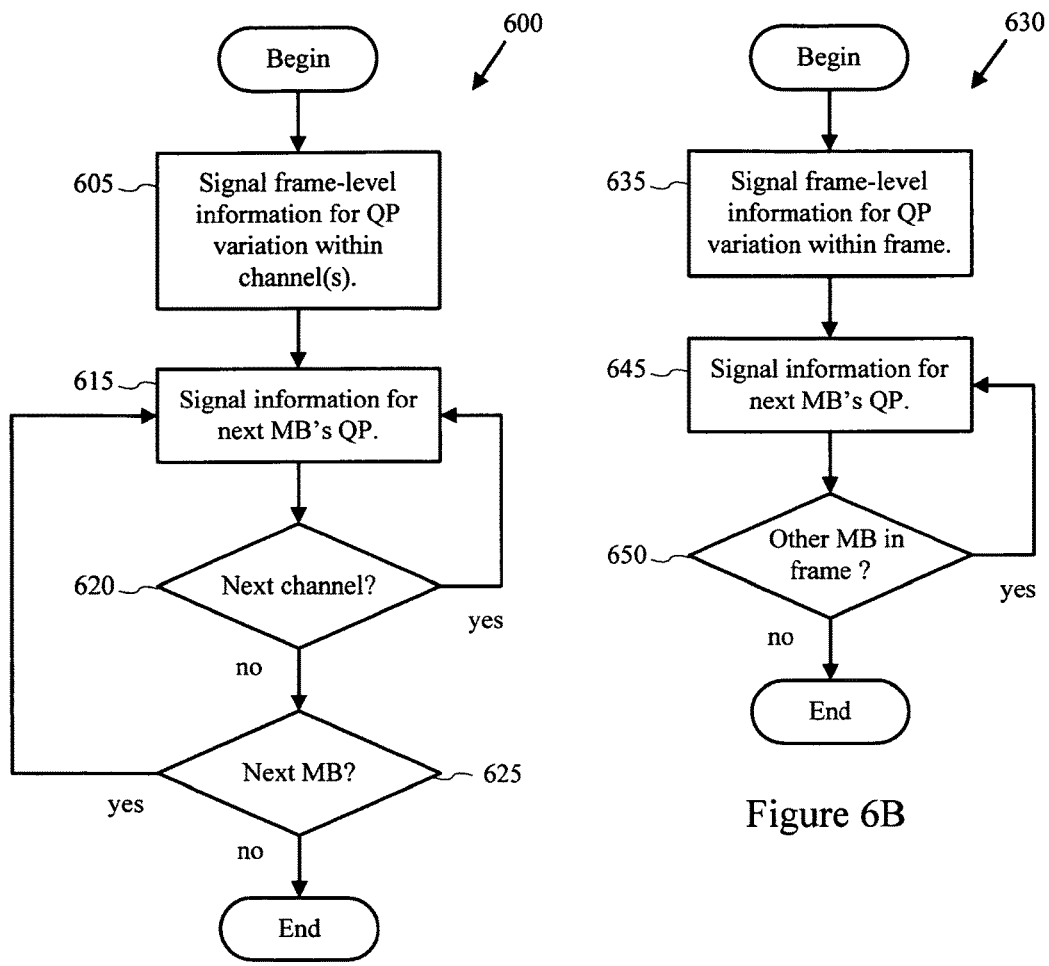
FIGS. 6A and 6B are flow charts showing exemplary techniques of signaling QPs for macroblocks of enhancement layer video for a picture, where the QPs vary spatially and/or across color channels.

FIG. 6A is a flowchart showing details (600) of one approach to signaling (555) the QPs for macroblocks in each of plural color channels.

The tool signals (605) frame-level information for QP variation within one or more of the channels. For example, the tool signals at the frame level the number of bits used to define macroblock QPs relative to the frame QP for each of the channels. Alternatively, the tool signals information indicating a QP index table and populates the table with a plurality of values for different QPs, which can include the channel QP. A different table is indicated for each of the color channels or, alternatively, two or more of the color channels can share a table. Additionally, one or more of the colors channels may not vary spatially over the frame, and so only a single QP may be indicated for that channel.

On a macroblock-by-macroblock basis, the tool signals (615) information for the QP of the next macroblock. In one embodiment, the tool signals whether the actual QP of the macroblock is the same as the macroblock's predicted QP, which can be the QP of the frame for the color channel or a spatially predicted value for the QP of the macroblock. Macroblock QP prediction rules vary depending on implementation. If the actual QP is not the same as the predicted QP, the tool then signals a difference value between the QP of the macroblock and the predicted QP. Alternatively, the tool signals whether the actual QP of the macroblock is equal to the macroblock's predicted QP, which again can be the QP of the frame for the color channel or a spatially predicted QP value for the macroblock. If the macroblock QP is not equal to the predicted QP, then the tools signals that the QP of the macroblock is one of a plurality of QP values in a QP index table.

After the tool has signaled information for the QP of the macroblock in the given color channel, the tool checks (620) whether there is another color channel with a spatially varying QP. If there are one or more other color channels whose QPs have not been signaled, then the tool performs the signaling (615) step for the macroblock in the next color channel. If there is not another color channel with a spatially varying QP, the tool checks (625) whether there is another macroblock in the frame. The macroblocks can be checked according to a raster scan order or some other order. If there is another macroblock in the channel whose QPs have not been signaled, then the tool performs the signaling (615) and checking (620) steps for the next macroblock. If there is no other macroblock in the frame, then the tool is done signaling the QPs for macroblocks in each color channel of the frame.

D. QP Signaling for Macroblocks in the Frame.

FIG. 6b is a flowchart showing details (630) of one approach to signaling (535) the spatially varying QPs of the macroblocks in the frame.

As a first step, the tool signals (635) frame-level information for QP spatial variation over the frame. For example, the tool signals at the frame level the number of bits used to define macroblock QPs relative to the frame QP. Alternatively, the tool signals information indicating a QP index table and populates the table with a plurality of values for different QPs.

On a macroblock-by-macroblock basis, the tool signals (645) information for the QP of the next macroblock. The tool signals whether the QP of the macroblock is to the same as the macroblock's predicted QP, which can be the QP of the frame or a spatially predicted value for the QP of the macroblock. Macroblock QP prediction rules vary depending on implementation. If the actual QP is not the same as the predicted QP, the tool signals a difference value between the QP of the macroblock and the predicted QP. Alternatively, if the macroblock QP is not equal to one the predicted QP, then the tool signals that the QP of the macroblock is one of a plurality of QP values in a QP index table.

After the tool has signaled information for the QP of the macroblock for the frame, the tool checks (650) whether there is another macroblock in the frame. The macroblocks can be checked according to a raster scan order or some other order. If there is another macroblock in the frame, then the tool performs the signaling (645) step for the next macroblock. If there is not another macroblock in the frame, then the tool finishes.

E. Generalized Decoding Technique.

Figure 7:
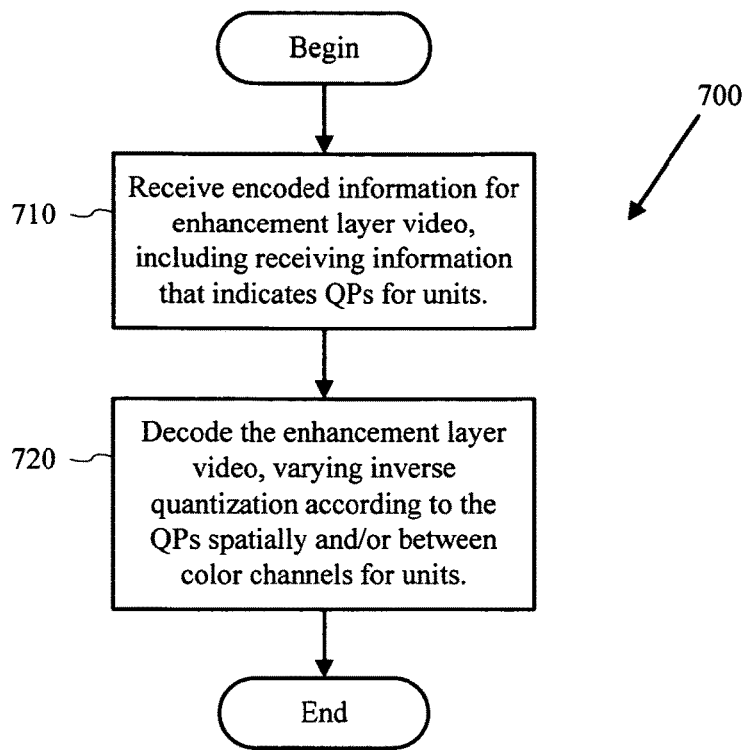
FIG. 7 is a flow chart of a generalized technique for decoding enhancement layer video quantized with one or more QPs that vary spatially and/or across color channels of a picture.

FIG. 7 shows a general method (700) for decoding enhancement layer video with inverse quantization that varies spatially across a picture or across color channels of the picture. A decoding tool (300), such as the one described with reference to FIG. 3, is used to perform the technique (700), or some other tool may be used.

The decoding tool receives (710) encoded information in a bit stream for enhancement layer video. The encoded information includes information that indicates QPs for units (e.g., macroblocks, blocks) of a picture or its channels. In some embodiments, the tool receives information signaled according to the techniques shown in FIGS. 5, 6A and 6B, receiving syntax elements that are signaled, evaluating the syntax elements and following the appropriate conditional bit stream paths, to determine QPs that vary spatially and/or between channels of a picture. Alternatively, the tool receives QP information signaled according to another approach.

The tool then decodes (720) the enhancement layer video. In doing so, the tool varies inverse quantization (according to the signaled QP information) spatially and/or between channels for units of the enhancement layer video.

The tool performs the technique (700) for a picture of the enhancement layer video and repeats the technique on a picture-by-picture basis. Alternatively, the tool performs the technique for a group of pictures, slice, or other section of video, and repeats the technique on that basis.

V. Predictive Coding and Decoding of Quantization Parameters.

According to a second set of techniques and tools, an encoder predictively codes quantization parameters using spatial prediction. A corresponding decoder predicts the quantization parameters using spatial prediction during decoding. For example, the encoder and decoder predict a macroblock's QP using a QP prediction rule than considers QPs of spatially adjacent macroblocks within a picture or channel of a picture. Spatial prediction of QPs can be used to encode QPs that vary both spatially and between channels, or it can be used in encoding and decoding of other types of QPs.

A. Generalized Encoding.

Figure 8:
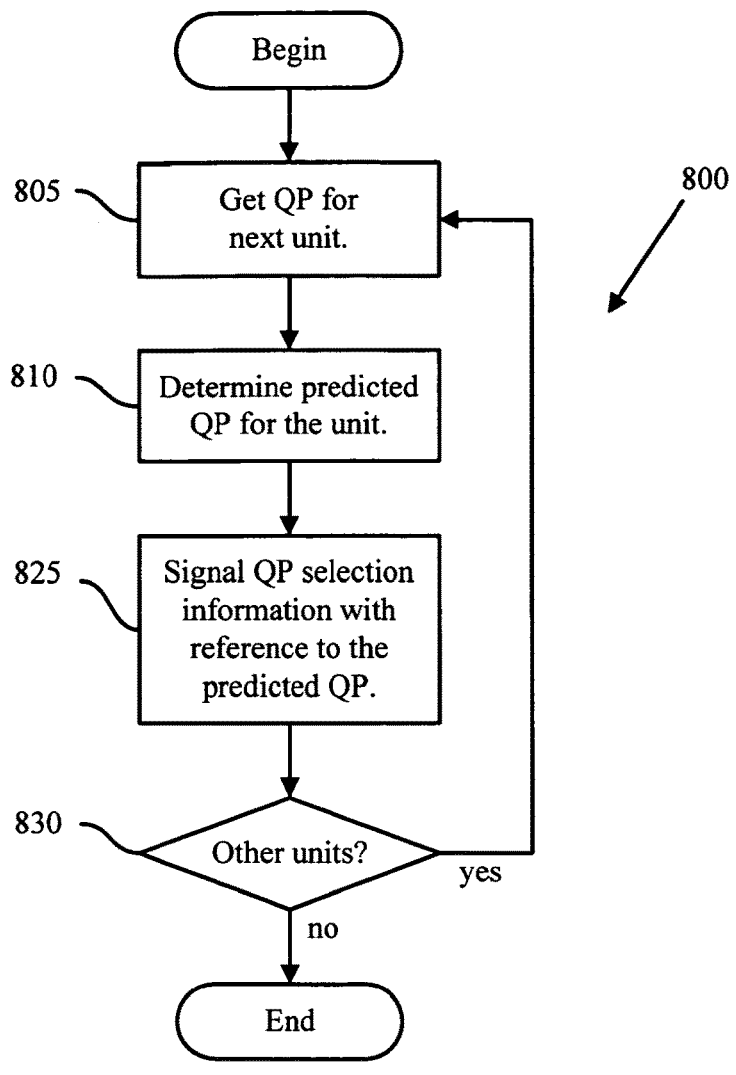
FIG. 8 is a flow chart of an generalized technique for using spatial prediction to encode and signal QPs for units of video.

FIG. 8 is a flowchart showing a generalized technique (800) for encoding and signaling QPs using spatial prediction. An encoding tool (200), such as that described with reference to FIG. 2 may be used to perform the method (800), or some other tool may be used. The technique (800) is described with reference to an entire picture, but the technique may be applied separately to each color channel in the picture.

The tool gets (805) the QP for the next unit in the picture. The unit can be a macroblock, block or other region of the picture. As the technique (800) addresses encoding and signaling of QP values, the encoder has already determined QPs of the units and the QP of the picture.

The tool determines (810) the predicted QP for the unit. The value of the predicted QP depends on the QP prediction rule in operation. Although the QP prediction rule depends on implementation, the encoder and decoder use the same QP prediction rule, whatever it happens to be. A first example prediction rule compares QPs of units to the left of the current unit and above the current unit. If the QPs of the two neighboring units are the same, the encoder uses that QP as the predicted QP. Otherwise, the encoder uses the picture QP as the predicted QP for the current unit. According to a second example prediction rule, the encoder uses the median QP among QPs for left, top, and top right neighbors as the predicted QP. Alternatively, the encoder uses another prediction rule, for example, considering a single neighbor's QP to be the predicted QP. For any of these example rules, the QP prediction rule addresses cases where one or more of the neighboring units are outside of a picture or otherwise have no QP, for example, by using the picture QP or other default QP as the predicted QP of the current unit, or by substituting a dummy QP value for the missing neighbor unit.

The tool signals (825) the QP for the unit with reference to the predicted QP. For example, the tool signals a single bit indicating whether or not the unit uses the predicted QP. If not, the tool also signals information indicating the actual QP for the unit. One approach to signaling the actual QP is to signal the difference between the QP for the unit and the predicted QP. Another approach is to signal a QP index that indicates an alternative QP in a table of QPs available to both the encoder and the decoder. Alternatively, instead of signaling the use/do-not-use selection decision separately from selection refinement information, the tool jointly signals the selection information, using a single code to indicate not to use the predicted QP and also indicating the actual QP to use.

The tool then checks (830) to see whether there are other units with QPs to be encoded in the picture (or channel). If there are other units, then the tool repeats the steps of getting (810) the QP for the next unit, determining (810) the predicted QP for that unit, and signaling (825) the QP for that unit.

B. Generalized Decoding.

Figure 10:
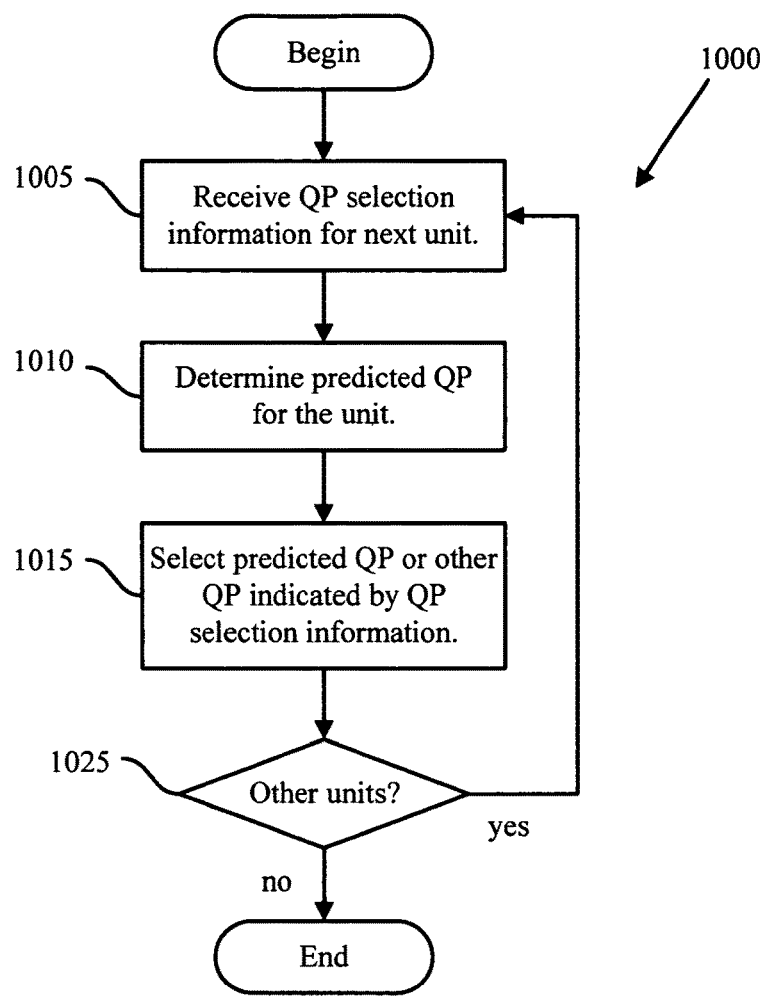
FIG. 10 is a flow chart of a generalized technique for using spatial prediction to decode QPs for units of video.

FIG. 10 is a flowchart showing a general technique (1000) for using spatial prediction to decode QPs for units of video A decoding tool, such as the decoding tool (300) described with reference to FIG. 3 or other decoding tool, performs the technique (1000). The technique (1000) is described with reference to an entire picture, but the technique may be applied separately to each color channel in the picture.

The tool receives (1010) QP selection information for the next unit (e.g., macroblock, block) in the picture. Generally, the selection information indicates whether the QP for the unit is the predicted QP or another QP, in which case the QP selection information also indicates what the other QP is. For example, the tool receives (as part of the QP selection information) a single bit indicating whether or not the unit uses the predicted QP. If not, the tool also receives (as part of the QP selection information) information indicating the actual QP for the unit. In a differential coding approach, the tool receives information indicating the difference between the QP for the unit and the predicted QP. In an alternative QP selection approach, the tool receives a QP index that indicates an alternative QP in a table of QPs available to both the encoder and the decoder. The QP selection information can include a separate decision flag and selection code, or it can include a single code that jointly represents the information.

The tool predicts (1010) the QP of the unit, and the value of the predicted QP depends on the QP prediction rule in operation. Any of the example QP prediction rules described with reference to FIG. 8, when used during encoding, is also used during decoding. Even when the predicted QP is not used as the actual QP for the current unit, the predicted QP is used to determine the actual QP. Alternatively, when the QP selection information indicates that a predicted QP is not used, the encoder skips determination of the predicted QP and decodes an independently signaled QP for the current unit.

The tool selects (1015) between the predicted QP and another QP, using the QP selection information. For example, the tool interprets part of the QP selection information that indicates whether or not the unit uses the predicted QP. If not, the tool also interprets additional QP selection information that indicates the other QP for the unit. In a differential coding approach, the tool combines a differential value and the predicted QP to determine the other QP. In an alternative QP selection approach, the tool looks up a QP index in a table of QPs available to determine the other QP.

The tool then checks (1025) whether there are other units with QPs to be reconstructed in the picture (or channel). If there are, then the tool repeats the steps of receiving QP selection information for the next unit, determining the predicted QP for that unit, and selecting the QP for that unit.

C. Exemplary Prediction Rules.

Figure 9:
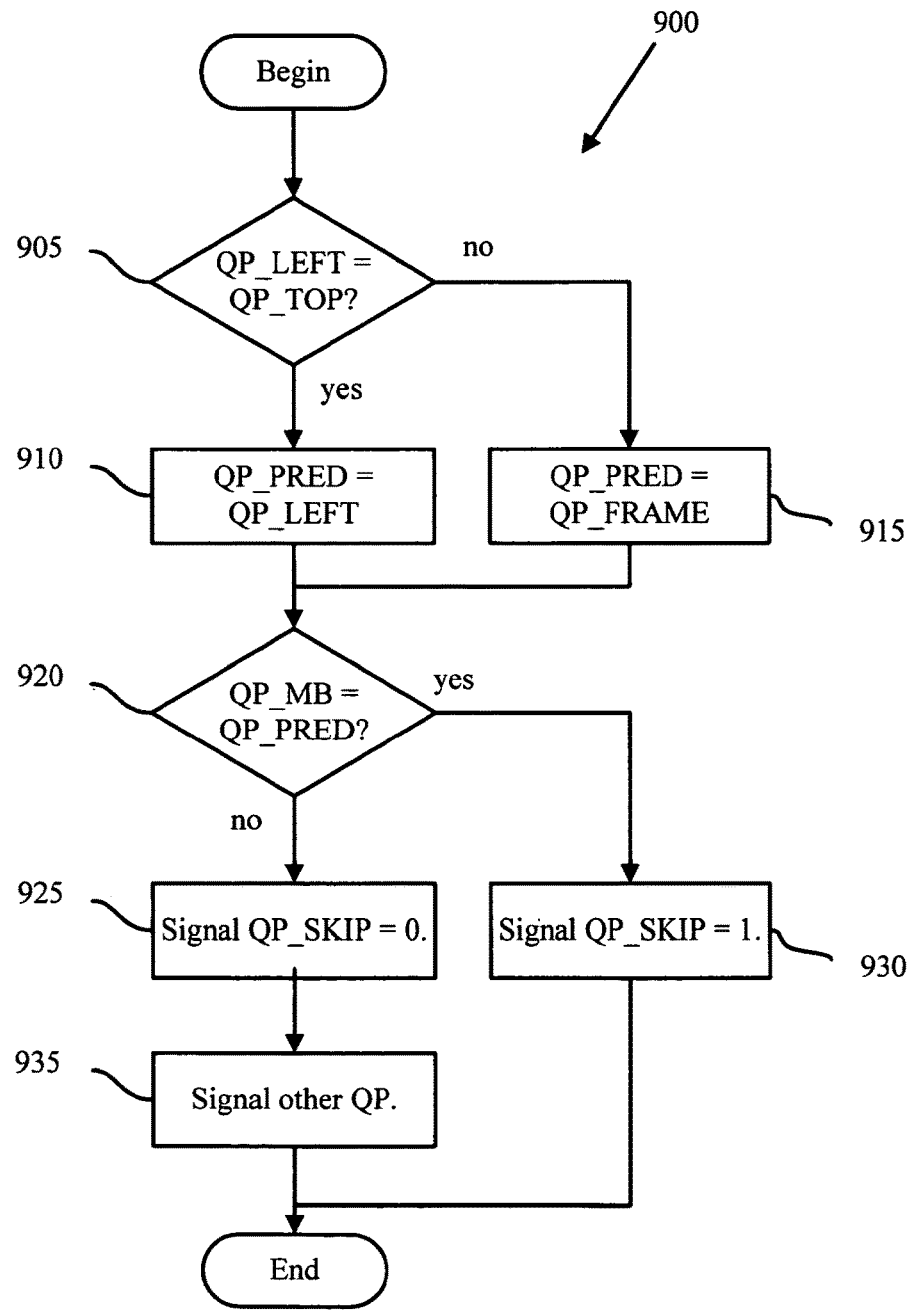
FIG. 9 is a flow chart of an exemplary technique of using spatial prediction to encode and signal a QP for a macroblock.

FIG. 9 is a flowchart illustrating a technique (900) for using an exemplary prediction rule for predicting the QP of a macroblock during encoding. An encoding tool, such as that described with reference to FIG. 2, performs the technique (900) when encoding and signaling the QP for a macroblock (QP_MB) in a frame or channel of the frame.

The tool first checks (905) whether the QP of a macroblock immediately to the left of the current macroblock (QP_LEFT) is the same as the QP of a macroblock immediately above the current macroblock (QP_TOP). QP_LEFT being equal to QP_TOP indicates a trend for the QPs of that particular section of the frame or color channel such that it is reasonable to assume that QP_MB, the QP of the current macroblock, is most likely close to, if not equal to, QP_LEFT. Thus, QP_PRED is set (910) to be equal to QP_LEFT. If QP_LEFT is not equal to QP_TOP, or if either QP_LEFT or QP_TOP is unavailable, then QP_PRED is set (915) to be equal to QP_FRAME, which is the default QP of the frame or color channel. Generally, QP_FRAME is equal to the average of the QPs for the frame or color channel, the most common QP in the frame or color channel, or some other value expected to reduce bit rate associated with signaling QPs for macroblocks.

In alternative QP prediction rules, QP_PRED is predicted according to the QPs of different macroblocks, such as QP_TOP and QP_BOTTOM (the QP of a macroblock directly below the current macroblock), QP_LEFT and QP_RIGHT (the QP of a macroblock directly to the right of the current macroblock), or some other combination of QPs in the frame or channel, depending on scan order followed in encoding QPs for the macroblocks. Or, QP_PRED is predicted with regard to only a single previously decoded QP (such as QP_LEFT), three previously decoded QPs, or some other combination of QPs. In some examples, the tool performs multiple checks to determine QP_PRED. For example, if QP_LEFT is not equal to QP_TOP_LEFT, the tool checks to determine whether QP_TOP_LEFT is equal to QP_TOP, and if so, sets QP_PRED equal to QP_LEFT (assuming horizontal continuity in QP values). In still other examples, QP_PRED is based on the QPs of other color channels or previously reconstructed macroblocks in other frames.

Returning to FIG. 9, the tool then checks (920) whether QP_MB is equal to QP_PRED. In areas of the frame or color channel with high levels of redundancy in QP values, QP_MB will most likely be equal to QP_PRED. In this instance, the tool signals (930) that QP_SKIP is 1. QP_SKIP is a one-bit indicator which, when set to 1, indicates that the current macroblock uses QP_PRED and the bit stream includes no other QP selection information for the current macroblock.

If QP_MB is not equal to QP_PRED, then the tool signals (925) that QP_SKIP is 0. Setting QP_SKIP to 0 indicates during encoding and decoding that QP_MB is not equal to the QP_PRED and therefore another QP is signaled (935) for QP_MB. In a differential coding approach, this other QP is signaled as a difference value relative to QP_PRED. In an alternate QP selection approach, QP_MB is signaled as one of a number of available QPs in a table of QP values. Or, the other QP is signaled in some other manner.

D. Treatment of Skip Macroblocks.

A QP prediction rule accounts for the unavailability of a neighbor QP by, for example, assigning a picture QP or other default QP to be the predicted QP for the current unit. In some implementations, an encoder and decoder reduce the frequency of unavailable QPs by buffering dummy QP values to units that otherwise lack QPs. For example, even if QP varies spatially in a frame or channel, some macroblocks may still be encoded and decoded without using a QP. For a skipped macroblock or macroblock for which all blocks are not coded (according to the coded block pattern for the macroblock), the bit stream includes no transform coefficient data and no QP is used. Similarly, when QP varies spatially and between channels, if a macroblock has transform coefficient data in a first channel but not a second channel (e.g., since the coded block status of the block(s) in the second channel is 0 in the coded block pattern), the bit stream includes no QP information for the macroblock in the second channel.

Thus, in some implementations, if QP is not available for a particular unit, the encoder and decoder infer the QP for the unit to be equal to the predicted QP for the unit, and the inferred value is used for subsequent QP prediction. For example, if a macroblock is skipped, the QP of the macroblock is set to be equal to the predicted QP for the macroblock, and the inferred QP value is buffered along with other actual QPs (and perhaps inferred QP values) for the frame.

VI. Combined Implementations.

In first and second combined implementations, an encoder and decoder use QPs that vary spatially and/or between channels of enhancement layer video, and the encoder and decoder use spatial prediction when encoding and decoding values of QP for macroblocks. The encoder and decoder use the same QP prediction rule in the first and second combined implementations, although other QP prediction rules can instead be used. In the first combined implementation, when the predicted QP is not used for a macroblock, the actual QP for the macroblock is signaled differentially relative to the predicted QP. In contrast, in the second combined implementation, when the predicted QP is not used for a macroblock, the actual QP for the macroblock is signaled as an alternative QP index to a table of available QPs for the frame.

A. General Signaling in First and Second Combined Implementations.

In the first and second combined implementations, QP_FRAME_UNIFORM is a 1-bit frame level syntax element. It indicates whether QP varies spatially across the frame. If QP_FRAME_UNIFORM equals 0, then the QP varies spatially across the frame. If QP_FRAME_UNIFORM does not equal 0, then the QP does not vary spatially across the frame, and the encoder and decoder use simple frame-level signaling of frame QP.

Similarly, QP_CHANNEL_UNIFORM is a 1-bit frame level syntax element that indicates whether QP varies across the color channels of the frame. If QP_CHANNEL_UNIFORM equals 0, then QP varies across the color channels (in addition to potentially varying spatially within each channel). If QP_CHANNEL_UNIFORM does not equal 0, then QP does not vary across the color channels.

FIG. 11 illustrates bit stream syntax and pseudocode for receiving information that indicates frame QP and channel-specific QPs in first and second example combined implementations. FIGS. 11 through 16 show color channels for the YUV color space, but the pseudocode could be adapted to the RGB space, YCbCr, or some other color space.

If QP_CHANNEL_UNIFORM does not equal 0, then QP does not vary across the color channels, and the bit stream includes N bits signaling QP_FRAME. If QP_CHANNEL_UNIFORM equals 0 then the bit stream includes N bits for QP_FRAME_Y, N bits for QP_FRAME_U, and N bits for QP_FRAME_V. The value of N can be pre-defined, set for a sequence, or even set for a frame. Moreover, although FIG. 11 shows the same value of N bits for all types of QP, different numbers of bits can be used to signal QP_FRAME, QP_FRAME_Y, QP_FRAME_U, and/or QP_FRAME_V.

FIGS. 11 and 13 to 16 illustrate decoder-side operations to receive bit stream syntax elements and determine QPs of macroblocks. The corresponding encoder-side encoding and signaling operations mirror the operations shown in FIGS. 11 and 13 to 16. For example, instead of receiving information for a differential QP value (or alternate QP index) and decoding it, an encoder determines the differential QP value (or alternate QP index) and signals it.

B. Spatial Prediction Rule in First and Second Combined Implementations.

FIG. 12 shows an example QP prediction rule used by the encoder and the decoder in the first and second example combined implementations. The QP prediction rule generally corresponds to the rule explained with reference to steps (905, 910 and 915) of FIG. 9 For a current macroblock, if both the left neighboring macroblock and the top neighboring macroblock are available, and the two neighboring macroblocks have equal QPs, then this QP is used as the predicted QP for the current macroblock. If, however, QP_TOP is different from QP_LEFT, or if either of the neighbors is unavailable, the tool uses QP_FRAME (or the appropriate channel-specific QP_FRAME_value for the Y, U or V channel) as the predicted QP for the current macroblock.

Alternatively, the encoder and the decoder use a different QP prediction rule. For example, the encoder and decoder set the predicted QP for a current macroblock to be the median of QP values from the left, top and top-right neighbors. Or, the encoder and decoder set the predicted QP for a current macroblock to be QP_LEFT if the QP values from top-left and top neighbors are the same (showing a horizontal consistency trend), set the predicted QP for the current macroblock to be QP_TOP if the QP values from top-left and left neighbors are the same (showing a vertical consistency trend), and otherwise set the predicted QP for the current macroblock to be QP_FRAME.

C. Signaling QP Differentials in First Combined Implementation.

In a first scheme, the QP_MB is not the same as QP_PRED, the bit stream includes a differential value that indicates QP_MB relative to QP_PRED. Generally, the differential is signaled as a signed or unsigned integer according to a convention determined by the encoder and decoder.

FIG. 13 illustrates bit stream syntax and pseudocode for receiving information that indicates the number of bits used to differentially signal QP_MB for a frame or channels. The syntax elements shown in FIG. 13 are signaled at frame level in the bit stream. If QP_FRAME_UNIFORM=0, then QP varies spatially over the frame of enhancement layer video and thus QP_MB information is signaled at the macroblock level. If QP_FRAME_UNIFORM does not equal 0, then the QP of the frame (or channels) is signaled at the frame level of the bit stream.

If QP_CHANNEL_UNIFORM is not equal to 0, then the tool decodes NUM_BITS_QP_MB (3 bits). NUM_BITS_QP_MB (3 bits) is a 3-bit value that indicates the number of bits used to signal QP_MB differentials for macroblocks in a frame. This yields a number from 0 bits to 7 bits for differential QP_MB information. When the number of bits is 0, the predicted QP is always used for macroblocks, since no differential bits are allowed. At the other extreme, when the number of bits is 7, differentials within a range of $2^7=128$ steps relative to QP_PRED can be signaled. Depending on convention, the differential values can vary from −64 to 63 in integer QP steps, −32 to 95 in integer QP steps, −32 to 31.5 in half-QP steps, etc. In some implementations, the range is generally centered around QP_PRED (or differential of zero). Setting the number of bits used to signal differential QP_MB information trades off the costs of signaling the differential QP_MB information at higher resolution versus the quality benefits of using the greater range of QP or resolution of QP.

If QP_CHANNEL_UNIFORM is =0, then the tool decodes NUM_BITS_QP_MB_Y (3 bits), NUM_BITS_QP_MB_Y (3 bits), and NUM_BITS_QP_MB_Y (3 bits), which are 3-bit values that indicate the number of bits used to signal QP_MB differentials for macroblocks in the Y channel, the U channel, and the V channel, respectively. This yields a number from 0 bits to 7 bits for differential QP_MB information in the respective channels. Different channels do not need to use the same number of differential QP_MB bits as each other. For example, the Y channel may be much more complex than either the U channel or the V channel, and thus the Y channel may use 4 bits for differential QP_MB values whereas the U channel and the V channel each use 2 bits. By setting the number of differential QP_MB bits to zero for a channel, spatially adaptive quantization is effectively disabled for that channel.

FIG. 14 illustrates bit stream syntax and pseudocode for receiving information that indicates QP for each macroblock. FIG. 14 shows macroblock-level syntax elements. If QP_FRAME_UNIFORM is equal to 0, QP varies spatially over the frame. For a current macroblock, the bit stream includes a bit QP_SKIP, which is used to indicate whether QP_MB is equal to QP_PRED. If QP_SKIP is equal to 1, then QP_MB is set to be equal to QP_PRED. QP_SKIP=0 indicates that QP_MB is being signaled explicitly. If so, the next bit stream syntax elements depend on whether QP_CHANNEL_UNIFORM is equal to 0.

If QP_CHANNEL_UNIFORM is not equal to 0, then the bit stream includes DIFF_QP_MB (NUM_BITS_QP_MB bits). In the example of FIG. 13, NUM_BITS_QP_MB can be an integer from 0 to 7. For the current macroblock, DIFF_QP_MB represents the difference between QP_MB and QP_PRED. QP_MB is determined to be: QP_MB=DIFF_QP_MB+QP_PRED, where QP_PRED is the already predicted QP for the current macroblock.

If QP_CHANNEL_UNIFORM is equal to 0, then QP for the current macroblock varies across the different color channels of the frame, and so the bit stream includes DIFF_QP_MB_Y (NUM_BITS_QP_MB_Y bits), DIFF_QP_MB_U (NUM_BITS_QP_MB_U bits), and DIFF_QP_MB_V (NUM_BITS_QP_MB_V bits). In the example of FIG. 13, the number of bits for differential QP_MB per channel can be an integer from 0 to 7. DIFF_QP_MB_Y represents the difference between QP_MB_Y and QP_PRED_Y. QP_MB_Y=DIFF_QP_MB_Y+QP_PRED_Y. DIFF_QP_MB_U and DIFF_QP_MB_V represent similar values for the U and V channels, respectively.

This design allows for a very simple and efficient way to exploit inter-macroblock redundancy in QPs. Even when different color channels use different quantizers for a given macroblock, a 1-bit QP_SKIP element for the macroblock is sufficient to indicate that the QPs of the color channels are identical to the QPs of the corresponding color channels of a neighboring macroblock (such as the left or top neighbor). Further, prediction using a simple comparison and selecting a single neighboring macroblock's QP is simpler than blending two or more neighboring macroblocks—it eliminates the need for a median or averaging operation, and provides similar efficiency in compression. More complicated QP prediction rules can provide more accurate prediction at the cost of higher computational complexity.

In the approach shown in FIGS. 13 and 14, a simple fixed length coding (FLC) table (with code lengths that can vary from frame to frame or channel to channel) is used. For many distributions of differential QP_MB values, performance of such FLCs can be as good as a variable length coding. Alternatively, an encoder and decoder use variable length codes for differential QP_MB values.

Additionally, the ability to send the number of bits used to signal the differential QP provides an additional degree of flexibility in improving compression efficiency. If the macroblock QPs are very close to the frame QP, this proximity can be exploited by using only 1 or 2 bits to signal the differential QP_MBs for the macroblocks that do not use predicted QP. If the macroblock QPs are very different (in terms of having a larger range), more bits are used to signal the differential QP_MBs for the macroblocks.

The number of bits used to signal the differential QP_MBs for each color channel can also be different based on the characteristics of the respective macroblock QPs are for each channel. For example, if the QP of the U and V channels for all of the macroblocks remains the same, and the luma QP varies spatially for the macroblocks, the tool uses zero bits for signaling the differential QP_MB for each of the U and V channels, and 1 or more bits for signaling the differential QP_MBs of the Y channel.

D. Signaling Alternative QPs in Second Combined Implementation.

In the second combined implementation, if QP_SKIP is not equal to 1, then QP_MB is explicitly signaled using a QP index at the macroblock level. The QP index references a QP in a table of available QPs, which is signaled at frame level. FIG. 15 illustrates bit stream syntax and pseudocode for receiving information that specifies the QP values in the table for a frame (or tables for channels), then populating the QP table. FIG. 15 shows frame-level syntax elements.

If QP_FRAME_UNIFORM is equal to 0 (QP varies spatially across the frame) and QP_CHANNEL_UNIFORM is not equal to 0 (QP does not vary across the color channels in the frame), the bit stream includes syntax elements specifying the values of a QP table for the frame. NUM_QP_INDEX (3 bits) is a 3-bit value regulating the number of different QPs in the table for the frame. NUM_QP_INDEX has $2^3$=8 possible values, from 0 to 7. In other examples, NUM_QP_INDEX may be signaled using more or less bits.

The internal variable NUM_QP, also regulating the number of different QPs in the table, is equal to NUM_QP_INDEX+2, for a range of 2 to 9. The first QP in the QP index table, QP_MB_TABLE[0], is QP_FRAME, the default QP value for the frame. The available QPs are generally ordered from most frequent to least frequent, to facilitate effective variable length coding of QP indices at macroblock level. For example, in the tables shown in FIGS. 17A to 17F, a single bit is used to signal if QP_MB is equal to QP_MB_TABLE[0].

The remaining rows of the QP table are filled, from position 1 through the position NUM_QP-1, by receiving and decoding a QP value for each position. In FIG. 15, the bit stream includes 8 bits to signal the QP value of each position in the table, though in other examples more or less bits can be used. In FIG. 15, the QP index table is produced with QP_FRAME at position 0 in the table and signaled QP values at each of the other positions in the table from 1 to NUM_QP_INDEX+1.

If QP_CHANNEL_UNIFORM is equal to 0 (QP varies across the color channels in the frame), the bit stream includes syntax elements to populate a QP table for each of the Y, U, and V color channels in the frame. For each channel, the positions of the table are filled with the channel-specific QP and alternate QPs.

FIG. 16 illustrates bit stream syntax and pseudocode for receiving information that indicates QP for a macroblock, then determining the QP, in the second combined implementation. FIG. 16 shows macroblock-level syntax elements. QP_SKIP is used as in the first combined implementation. Again, if QP_SKIP is equal to 1 for a current macroblock, then QP_MB=QP_PRED for that macroblock. If QP_SKIP is not equal to 1, then additional information indicating QP_MB is signaled explicitly for the macroblock. In the second combined implementation, however, the tool signals the non-predicted QP with reference to the QP table established at the frame level.

When QP_CHANNEL_UNIFORM indicates QP does not vary between channels, NUM_QP_EFFECTIVE, an internal counter, equals NUM_QP-1 (where NUM_QP is set from frame-level information in the bit stream, as in FIG. 15). This establishes the count of alternate QP values stored in the QP table for the frame. For example, if NUM_QP is equal to 9, then the QP table has 8 alternate QP values, the frame QP value at position 0 and 8 alternate QP values at positions 1-8 in the table. Thus, NUM_QP_EFFECTIVE is equal to 8. QP_ID is a value that is used to locate a QP in the QP table. Initially, QP_ID is 0.

If NUM_QP_EFFECTIVE is greater than 1, the QP table comprises the default value and at least two alternate values at positions 1 and 2, and a variable length code ("VLC") in the bit stream indicates the QP_ID (index of position in the QP table) of the QP to use for the macroblock. FIGS. 17A-F show several examples of VLC tables that may be used for variable length coding and decoding. For example, FIG. 17A shows a VLC table (1700) corresponding to NUM_QP_EFFECTIVE=2, wherein the VLC table (1700) comprises a QP_ID of 0 corresponding to a VLC of 0. The VLC table (1700) further comprises a QP_ID of 1 corresponding to a VLC of 1. Similarly, FIG. 17B shows a VLC table (1705) corresponding to NUM_QP_EFFECTIVE=3, with VLCs s for QP_IDs of 0, 1, and 2. FIGS. 17C-F show VLC tables (1710, 1715, 1720, 1730) corresponding to NUM_QP_EFFECTIVE=4, 5, 6, and 7, respectively. Typically, the most common QP_ID values in the frame or color channel are positioned near the top of the VLC tables, so that the most common QP_IDs are signaled using fewer bits. Alternatively, the encoder and decoder use other VLCs to represent QP_IDs. Instead of using different VLC tables for different values of NUM_QP_EFFECTIVE, the encoder and decoder can use a single table, but changing multiple tables typically results in slightly more efficient signaling. (For example, compare VLCs lengths for QP_ID==1 in the different VLC tables in FIGS. 17A and 17B.)

There is no VLC table for NUM_QP_EFFECTIVE=1 because, if a QP table has only the QP_FRAME (or channel QP) and one alternate QP, the non-predicted QP can be inferred to be the QP that is not the predicted QP. In other words, QP_PRED for the current macroblock is one of the two QP values in the table. If the macroblock does not use QP_PRED (i.e., QP_SKIP==0), then the only other option for the macroblock is the other QP in the QP table, and no VLC is included in the bitstream for QP_ID.

If NUM_QP_EFFECTIVE is greater than 1, the bit stream includes a VLC associated with a QP_ID in one of the VLC tables, where NUM_QP_EFFECTIVE indicates the table to use. For example, if NUM_QP_EFFECTIVE is equal to 4 and the tool decodes the Huffman code 110, then the tool determines the corresponding QP_ID of 2 from the table (1710) shown in FIG. 17C. When NUM_QP_EFFECTIVE is equal to 4, the number of alternate QP values in the QP table is 4, and the QP table also includes the QP_FRAME. Thus, the QP_IDs in the QP table are 0, 1, 2, 3 and 4. The corresponding VLC table includes only four positions, however, because a position is not needed for the predicted QP, which could have ID of 0, 1, 2, 3 or 4 in the QP table. This helps reduce overall bit rate associated with signaling QP_IDs.

Thus, whether or not NUM_QP_EFFECTIVE is greater than 1, the decoding tool determines the ID of the QP_PRED, which is shown as QP_PRED_ID. The tool then checks whether the signaled QP_ID (or initialized QP_ID) is greater than QP_PRED_ID. If so, then the tool increments QP_ID. If not, then the tool does not increment QP_ID. Once the tool has determined the appropriate QP_ID, the tool determines QP_MB with the value in the QP table indicated by QP_ID.

For example, if the predicted QP for a current macroblock has a QP_PRED_ID of 1 and NUM_QP_EFFECTIVE is 1, QP_ID retains its initial value of 0 and references the other (non-predicted) QP in the QP table with two available QPs. If the QP_PRED_ID of the predicted QP is 0, QP_IP is incremented and references the other (non-predicted) QP in the QP table with two available QPs.

As another example, let QP_PRED_ID be equal to 2 for a current macroblock. If the tool receives a VLC that indicates QP_ID of 0 in the table (1715) shown in FIG. 17D, since QP_ID<QP_PRED_ID, the tool looks up the value QP_ID of 0 in the QP table. In contrast, if the tool receives a VLC that indicates QP_ID of 4 in the table (1715) shown in FIG. 17D, the tool increments the QP_ID and looks up the value QP_ID of 4 in the QP table. By exploiting the fact that signaled QP_ID values need not include QP_PRED_ID as a possible choice, overall bit rate associated with signaling QP_ID values is reduced.

If QP_CHANNEL_UNIFORM is equal to 0 (QP varies between channels), then this process is performed for the macroblock in each color channel of the frame where QP_SKIP is not equal to 1.

The approach of the second combined implementation is particularly useful if a small set of QP choices in a wide range are desired for QPs for macroblocks in the frame or color channel. For example, if certain sections of the frame or color channel are very complex spatially or temporally while other sections of the frame or color channel are relatively uniform, this scheme may help improve overall compression of the frame of enhancement layer video. This technique also exploits inter-macroblock redundancy within sections, allows for signaling of the most common macroblock QPs using the shortest VLC codes, and, in certain cases, improves performance by using a VLC code for a lower QP_ID to signal a QP_ID that is actually higher.

VII. Alternatives.

Although many of the examples presented herein relate to encoding and decoding of enhancement layer video, the techniques and tools described herein for spatial prediction of QPs can be applied to other types of video more generally. Similarly, the techniques and tools described herein for varying QP spatially and/or across channels can be applied to other types of video more generally.

Many of the examples of QP prediction involve spatial prediction of a single predicted QP for a current unit. Alternatively, an encoder and decoder compute multiple predictors for a current unit, and the bit stream includes information indicating a selection of the predicted QP for the current unit from among the multiple predictors. As another alternative, instead of performing spatial prediction of QPs, the encoder and decoder use temporal prediction from co-located macroblocks in other pictures, or use prediction of QPs of macroblocks in one channel from QPs of co-located macroblocks in another color channel.

In view of the many possible embodiments to which the principles of the disclosed invention may be applied, it should be recognized that the illustrated embodiments are only preferred examples of the invention and should not be taken as limiting the scope of the invention. In some cases certain steps in the above described techniques can be omitted or repeated. Rather, the scope of the invention is defined by the following claims. We therefore claim as our invention all that comes within the scope and spirit of these claims.

We claim:

1. One or more computer-readable media having stored thereon computer-executable instructions for causing a processing unit, when programmed thereby, to perform operations, wherein the one or more computer-readable media are selected from the group consisting of volatile memory, non-volatile memory, magnetic disk, CD-ROM, and DVD, the operations comprising:
encoding video for a picture organized in multiple color channels, including:
varying quantization spatially and between the multiple color channels of the video for the picture; and
for a current unit of the video for the picture, predicting a unit-level quantization parameter ("QP") for the current unit using multiple unit-level QPs for spatially neighboring units; and
outputting the encoded video for the picture in a bitstream, including:
signaling QP information in the bitstream that indicates multiple QPs that at least in part parameterize the varied quantization of the video for the picture, the QP information including the unit-level QP for the current unit signaled as a differential QP relative to the predicted unit-level QP for the current unit.

2. The one or more computer-readable media of claim 1, wherein the units are blocks, and wherein the encoding further includes determining whether to use spatial quantization variation between the blocks of the video for the picture based at least in part on a user setting that controls speed and complexity of the encoding.

3. The one or more computer-readable media of claim 1, wherein the units are blocks, and wherein the encoding further includes determining whether to use spatial quantization variation between the blocks of the video for the picture based at least in part on analysis of complexity and spatial variance of the video for the picture.

4. The one or more computer-readable media of claim 1, wherein the encoding includes performing the quantization on transform coefficients of units of the video for the picture.

5. The one or more computer-readable media of claim 1, wherein the QP information further comprises picture-level information that indicates one or more picture-level QPs for the video for the picture or respective color channels of the video for the picture.

6. The one or more computer-readable media of claim 1, wherein the spatially neighboring units include a left unit that is to the left of the current unit and an above unit that is above the current unit, and wherein the predicting the unit-level QP for the current unit uses one or more prediction rules based upon QP for the left unit and QP for the above unit.

7. The one or more computer-readable media of claim 6, wherein, according to the one or more prediction rules, if the QP for the left unit equals the QP for the above unit, then the predicted unit-level QP for the current unit is the QP for the left unit.

8. The one or more computer-readable media of claim 6, wherein, according to the one or more prediction rules:
when the QP for the left unit is not available, another QP is substituted for the QP for the left unit; and
when the QP for the above unit is not available, another QP is substituted for the QP for the above unit.

9. The one or more computer-readable media of claim 1, wherein the units are blocks, the operations further comprising:
during the encoding:
determining whether to use spatial quantization variation between the blocks of the video for the picture; and
determining whether to use quantization variation between color channels; and
as part of the outputting the encoded video:
signaling information in the bitstream that indicates whether the spatial quantization variation is used between the blocks of the video for the picture; and
signaling information in the bitstream that indicates whether the quantization variation between color channels is used.

10. A computer system comprising one or more processing units and memory, wherein the computer system implements a decoding system comprising:
a buffer configured to receive encoded data in a bitstream for video for a picture organized in multiple color channels, the encoded data including quantization parameter ("QP") information that indicates multiple QPs that at least in part parameterize inverse quantization of the video for the picture, the QP information including a differential QP for a unit-level QP for a current unit of the video for the picture; and
a video decoder configured to decode the video for the picture, wherein the video decoder is configured to vary inverse quantization spatially and between the multiple color channels of the video for the picture, and wherein the video decoder is further configured to, for the current unit:
predict the unit-level QP for the current unit using multiple unit-level QPs for spatially neighboring units; and
combine the predicted unit-level QP for the current unit with the differential QP from the bitstream for the current unit.

11. The computer system of claim 10 wherein the video decoder is further configured to perform the inverse quantization on transform coefficients of units of the video for the picture.

12. The computer system of claim 10, wherein the QP information further comprises picture-level information that indicates one or more picture-level QPs for the video for the picture or respective color channels of the video for the picture.

13. The computer system of claim 10, wherein the spatially neighboring units include a left unit that is to the left of the current unit and an above unit that is above the current unit, and wherein, to predict the unit-level QP for the current unit, the video decoder is configured to use one or more prediction rules based upon QP for the left unit and QP for the above unit.

14. The computer system of claim 13, wherein, according to the one or more prediction rules, if the QP for the left unit equals the QP for the above unit, then the predicted unit-level QP for the current unit is the QP for the left unit.

15. The computer system of claim 13, wherein, according to the one or more prediction rules:
when the QP for the left unit is not available, another QP is substituted for the QP for the left unit; and
when the QP for the above unit is not available, another QP is substituted for the QP for the above unit.

16. The computer system of claim 10, wherein the units are blocks, wherein the encoded data further includes information in the bitstream that indicates whether spatial quantization variation is used between the blocks of the video for the picture, and wherein the video decoder is further configured to determine whether to use the spatial quantization variation between the blocks of the video for the picture.

17. One or more computer-readable media having stored thereon encoded video produced by operations, wherein the one or more computer-readable media are selected from the group consisting of volatile memory, non-volatile memory, magnetic disk, CD-ROM, and DVD, the operations comprising:
  encoding video for a picture organized in multiple color channels, including:
    varying quantization spatially and between the multiple color channels of the video for the picture; and
    for a current unit of the video for the picture, predicting a unit-level quantization parameter ("QP") for the current unit using multiple unit-level QPs for spatially neighboring units; and
  outputting the encoded video for the picture in a bitstream, including:
    signaling QP information in the bitstream that indicates multiple QPs that at least in part parameterize the varied quantization of the video for the picture, the QP information including the unit-level QP for the current unit signaled as a differential QP relative to the predicted unit-level QP for the current unit.

18. The one or more computer-readable media of claim 17, wherein the QP information further comprises picture-level information that indicates one or more picture-level QPs for the video for the picture or respective color channels of the video for the picture.

19. The one or more computer-readable media of claim 17, wherein the spatially neighboring units include a left unit that is to the left of the current unit and an above unit that is above the current unit, and wherein the predicting the unit-level QP for the current unit uses one or more prediction rules based upon QP for the left unit and QP for the above unit.

20. The one or more computer-readable media of claim 19, wherein, according to the one or more prediction rules, if the QP for the left unit equals the QP for the above unit, then the predicted unit-level QP for the current unit is the QP for the left unit.

* * * * *